United States Patent
Vats et al.

(10) Patent No.: US 9,405,432 B2
(45) Date of Patent: Aug. 2, 2016

(54) USER-CONTROLLED 3D SIMULATION FOR PROVIDING REALISTIC AND ENHANCED DIGITAL OBJECT VIEWING AND INTERACTION EXPERIENCE

(71) Applicants: Nitin Vats, Meerut (IN); Gaurav Vats, Meerut (IN)

(72) Inventors: Nitin Vats, Meerut (IN); Gaurav Vats, Meerut (IN)

( * ) Notice: Subject to any disclaimer, the term of this patent is extended or adjusted under 35 U.S.C. 154(b) by 290 days.

(21) Appl. No.: 13/946,364

(22) Filed: Jul. 19, 2013

(65) Prior Publication Data

US 2014/0208272 A1    Jul. 24, 2014

(30) Foreign Application Priority Data

Jul. 19, 2012    (IN) ........................ 2253/DEL/2012

(51) Int. Cl.
*G06F 3/0481* (2013.01)
*G06F 3/01* (2006.01)
*G06T 19/20* (2011.01)
*G06F 3/0484* (2013.01)

(52) U.S. Cl.
CPC ............ *G06F 3/04815* (2013.01); *G06F 3/011* (2013.01); *G06F 3/04842* (2013.01); *G06F 3/04845* (2013.01); *G06T 19/20* (2013.01); *G06T 2219/2024* (2013.01)

(58) Field of Classification Search
CPC .......... G06Q 30/0601; G06Q 30/0643; G06Q 30/0603; G06Q 30/0641; G06Q 30/0277; G06Q 20/12; G06T 17/10; G06T 17/00; G06T 19/006; G06T 19/00; G06T 19/003; G06F 3/04815; G06F 17/30873; G06F 3/0481; G06F 3/04812; H04N 21/8146
See application file for complete search history.

(56) References Cited

U.S. PATENT DOCUMENTS

| | | | | |
|---|---|---|---|---|
| 6,563,520 B1 * | 5/2003 | Parker | ...................... | G06F 3/011 715/771 |
| 2005/0253840 A1 * | 11/2005 | Kwon | ................ | G06Q 30/0603 345/419 |
| 2006/0202985 A1 * | 9/2006 | Kobayashi | .............. | G06T 15/04 345/419 |
| 2009/0157478 A1 * | 6/2009 | Yang | .................. | G06Q 30/0201 705/7.29 |
| 2012/0069051 A1 * | 3/2012 | Hagbi | ................... | G06T 19/006 345/633 |

\* cited by examiner

*Primary Examiner* — Haixia Du
(74) *Attorney, Agent, or Firm* — Crose Law LLC; Bradley D. Crose

(57) ABSTRACT

Method, technology and system of user-controlled realistic 3D simulation and interaction are disclosed for providing realistic and enhanced digital object viewing and interaction experience with improved three dimensional (3D) visualization effects. A solution is provided to make available 3D-model/s carrying similar properties of real object, where performing user-controlled realistic interactions selected from extrusive interaction, intrusive interactions, time-bound changes based interaction and real environment mapping based interactions are made possible as per user choice.

44 Claims, 22 Drawing Sheets

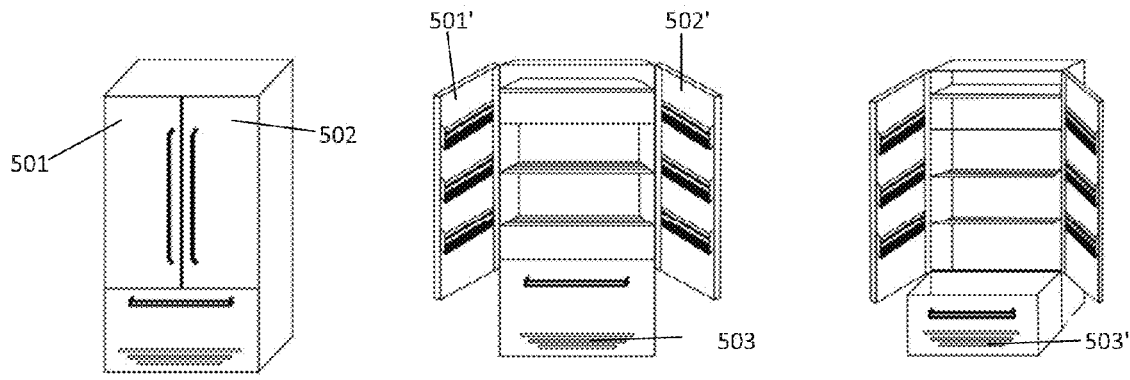
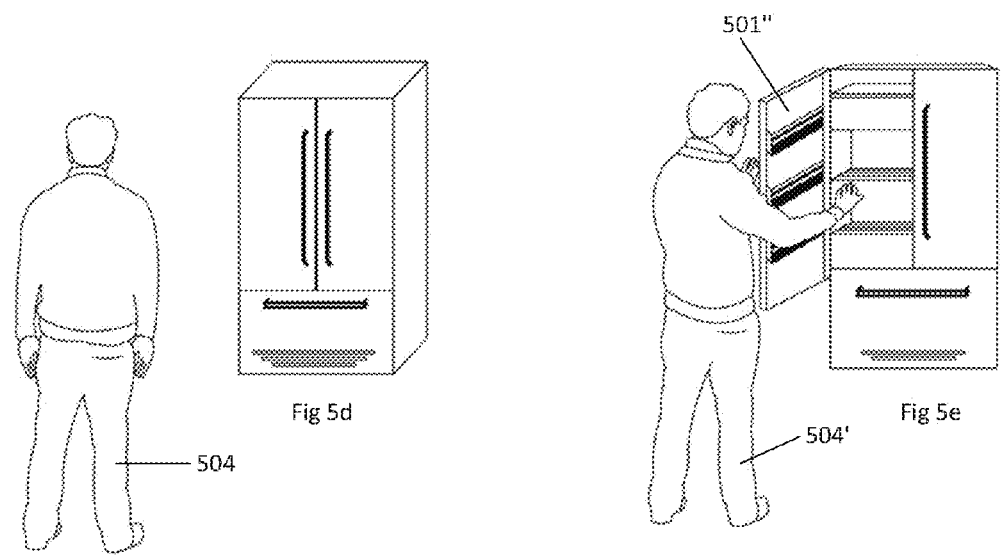

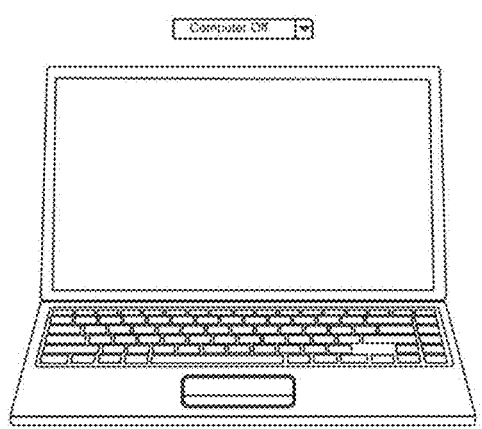
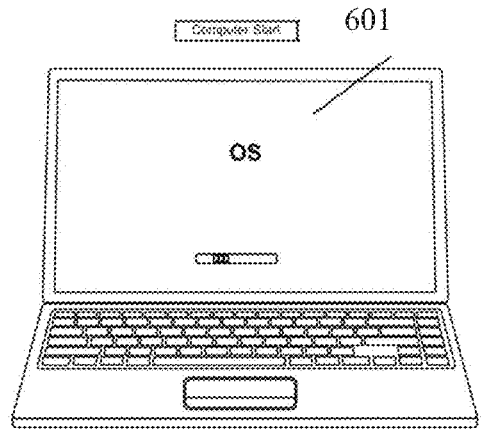
Fig. 6a        Fig. 6b
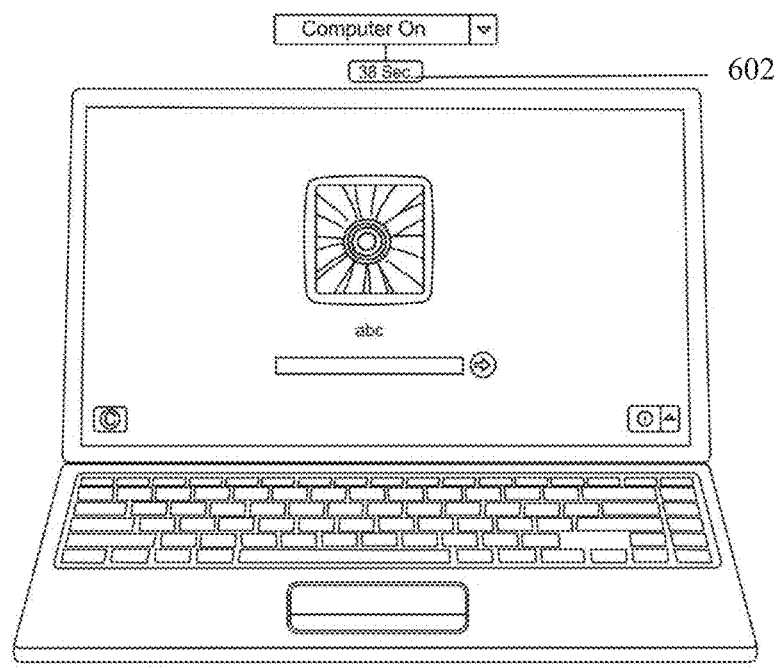
Fig. 6c

Fig. 8a　　　　　Fig. 8b　　　　Fig. 8e
Fig. 8c　　　　　Fig. 8d　　　　Fig. 8f

Fig. 9a
Fig. 9b
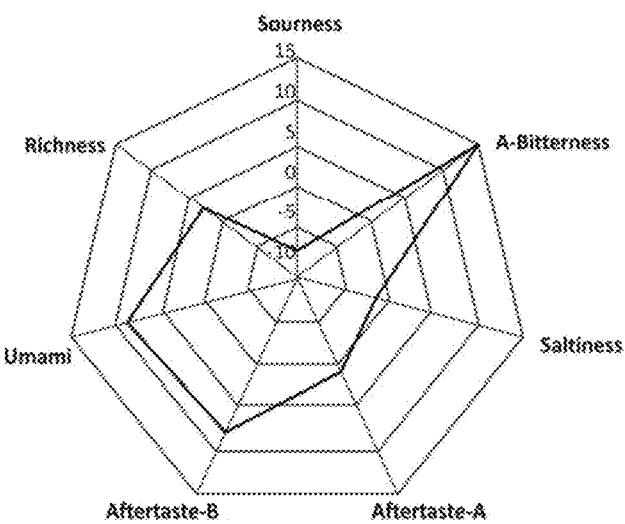
Fig. 9d
Fig. 9c
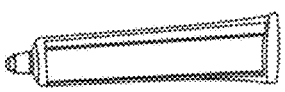
Fig. 10a
Fig. 10b
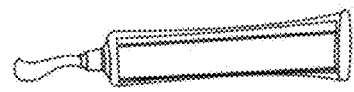
Fig. 10c
Fig. 10

USER-CONTROLLED 3D SIMULATION FOR PROVIDING REALISTIC AND ENHANCED DIGITAL OBJECT VIEWING AND INTERACTION EXPERIENCE

FIELD OF INVENTION

The present invention relates to field of virtual reality, particularly user-controlled realistic 3D simulation and interaction technology for providing realistic and enhanced digital object viewing and interaction experience with improved three dimensional (3D) visualisation effects. The applications of user-controlled realistic 3D simulation and interaction technology includes in the field of online shopping by providing enhanced digital object viewing and interaction experience, collaboration and object demonstration, e-learning, media, entertainment and content industry, computing, mechanical and communication industry.

BACKGROUND OF THE INVENTION

There is increasing trend in the use of three dimensional (3D) viewing in various industries such as in entertainment, mechanical engineering designs view, online shopping sites, and offline product advertisement panels. There are many web-based shopping markets, websites or store fronts which show images or in some case a short video of objects or products. The images are static and in some cases only enlarged or zoomed to get a clearer picture. In some other cases video of products are captured, but this makes the loading, and ultimately viewing slow, and further user get to see whatever is captured mostly either by streaming or through media player in two dimensional projections or partly in three dimensions. The images and written information displayed provides limited information about the desired object. Limited information here means information that is written and displayed related to object, which is available for view to the end user. This is a passive way of information transfer. In conventional systems, web based portals or sites, and online shopping portals, the user cannot interact with the product as possible when user or customer physically visits a shop to a great extent, for example, viewing the product in all possible angles, checking functionalities, asking any type of desired queries about the product, interacting with product to see its interior or exterior just like real scenario. This is active way of information transfer.

U.S. Pat. No. 7,680,694B2, U.S. Pat. No. 8,069,095B2, U.S. Pat. No. 8,326,704 B2, US20130066751A1, US20120036040A1, US20100185514A1, US20070179867A1 and US20020002511A1, discusses about solution for 3D view, and some form of interactions related of online shopping, shopping location, and stores. This is limited to displaying the virtual shopping location on a user computer by streaming a 3D interactive simulation view via a web browser. However, this doesn't provide for generating a 3D model which has real object properties in true sense capable of user-controlled simulation and interactions not restricted or limited to pre-set or pre-determined interactions. Conventional systems, methods and techniques lack in generating 3D-model carrying properties of real objects such as appearance, shape, dimensions, texture, fitting of internal parts, mirror effect, object surface properties of touch, smoothness, light properties and other nature, characteristics, and state of real object, where performing user-controlled realistic interactions such as viewing rotation in 360 degree in all planes, non-restrictive intrusive interactions, time-bound changes based interaction and real environment mapping based interactions as per characteristics, state and nature of the said object are lacking. U.S. Pat. No. 7,680,694 B2, U.S. Pat. No. 8,326,704 B2, WO 01/11511 A1 also discusses about a concierge or an animated figure or avatars or sales assistant, capable of offering information about products or graphics to customers, remembering customer buying behaviour, product choices, offering tips and promotions offer. These types of interactions are limited to pre-defined set of offers, information about products. The input query is structured and generally matched with database to find and retrieve answers. However there still exists gap in bringing out the real-time intelligent human-like interaction between the said animated figure and real human user. This is no mention of facial expressions, hand movements and precision which are prime criteria to receive a response from the animated figure or concierge which is human-like and as per the query of the real human user. For active communication, a natural interface such as understanding of language such as English is necessary. Such technology to decipher meaning of language during text chat by a virtual assistant or intelligent system and provide user query specific response is costly endeavour and still a problem to be solved.

A JP patent with Application Number: 2000129043 (publication Number 2001312633) discusses about a system, which simply show texture information, and touch sense information in form of write-up in addition to still picture information or a photographic image, an explanatory sentence, video, and only three-dimensional information which user have to read. This and other patents U.S. Pat. No. 6,070, 149A, WO0169364A3, WO 02/48967 A1, U.S. Pat. No. 5,737,533A, U.S. Pat. No. 7,720,276 B1, U.S. Pat. No. 7,353, 188 B2, U.S. Pat. No. 6,912,293 B1, US20090315916A1, US20050253840A1 discusses about 3D viewing and simulation, and virtual or online shopping experience. However lack in one or more of the following points and technologies given below.

Further, most existing technology of 3D simulation for providing digital object viewing and interaction experience, in addition to above also lack one or more of the following:

1. The existing simulated 3D-models are hollow models meaning such models doesn't allows intrusive interactions such as to see exploded view of the parts of a simulated 3D-model of an object in real-time, or open the parts of the 3D-model of object one by one as a person could have done in real scenario. For example, in conventional virtual reality set-up, a user cannot open the compressor of a refrigerator from a virtual 3D-model of refrigerator, or open or perform interactions with sub-part of the simulated 3D-model such as battery and other internal parts removed from a 3D-model of a mobile for interactions and realistic viewing, rotate tyres of car, move steering wheel to judge the movement and power steering, or examine the internal parts or interior built of a simulated 3D-model of mobile in real time. In some conventional cases, limited options are provided, on click of which an internal part of an object is visible in photographic or panoramic view, but such cannot do further analysis of internal parts beyond the provided options. Another example is 3D-view of a bottle filled with oil or any liquid, where only a 3d-simulated view can be displayed in conventional systems, but a user cannot open the cork of the bottle, or pour the liquid from the bottle in an interactive manner as per his desire which is possible in real scenario. In other words user-controlled interaction is not feasible as per user choice.

2. They don't allow realistic extrusive interaction such as rotating 3D-model of object/s in 360 degree in different planes with ability of interaction from any projected angle.

Mostly only 360 degree rotation in one plane is allowed in existing technologies. Further, current 3D-simulation technology lacks to give a realistic 3D-simulation effect or 3D visualization effect, lighting effect for light-emitting parts of 3D-model of object, interacting with 3D-models having electronic display parts for understanding electronic display functioning, sound effects, of object such that creating illusion of real objects is not very precise in virtual views. In real object input is given at some part such as sound button on TV of real object to perform desired operation such as producing sound in speakers. Similarly input in 3d object can be provided to perform operation of the part of 3d object emulating real scenario.

3. Another lack of originality and closeness to real-set up is operating pressure, judging sense of taste, sense of touch. For example, a user opening a movable-part of multi-part object such as refrigerator, where the user holds the handle, and applies pressure to open the refrigerator door. Existing virtual 3D-simulated models of object and technology cannot judge the smoothness or softness of the handle and the operating pressure or force required to open the refrigerator door.

4. Monitoring or visualizing time-bound changes observed on using or operating an object is not possible. User cannot check product or object behavior after a desired duration. For example checking the heating of iron, or cooling in refrigerators, or cooling generated by air conditioners in a room. Further, user cannot hear the sound when a refrigerator door is opened from a simulated 3D-model of object which mimics the real sound produced when opening the door of a real refrigerator in real setup. Further change in sound after certain intervals of time cannot be heard or monitored to experience the product performance, or to compare it with other product.

5. Further in real scenario a user can switch on a laptop, computer, iPad, mobile or any computing device, and check the start-up time, speed of loading of the operating system, and play music etc. Such interactions are lacking in real time for various virtual 3D-models and choice of user is limited to observing only the outer looks of the object such as laptop.

6. Real environment mapping based interactions are interactions where user environment, that is the place or location in the vicinity of user, is captured through a camera, mapped and simulated in real-time such that a realistic 3D-model or virtual object displayed on electronic screen can be seen interacting with the mapped and simulated environment. Such real-time interactions including mirror effect are lacking in current technologies.

7. The existing technology doesn't allow dynamic customization of texturing pattern of 3D-model during loading of the 3D-model.

Such real-time and enhanced interactions are lacking in current virtual reality related technologies. The above constraints in current available technology/technologies makes very difficult for human user to interact with things virtually in a way that he/she can interact in real world, and hence there is need for a technology that enhances digital object viewing and interaction experience, and bridges the gap between real and virtual world in true sense.

The object of the invention is to provide for user-controlled realistic 3D simulation for enhanced object viewing and interaction experience capable of displaying real products virtually in interactive and realistic 3D-model.

SUMMARY OF THE INVENTION

The object of the invention is achieved by a method and a system user-controlled realistic 3D simulation for enhanced object viewing and interaction experience.

According to one embodiment of the method, the method includes steps of
receiving a request by at least one input mode for display of 3D-model of the object,
displaying 3D-model of the said object in 3D-computer graphic environment, where the displayed 3D-model of the said object comprises at least one realistic 3D-view;
making available user-controlled realistic interactions with the displayed 3D-model to an user, where the user-controlled realistic interactions comprises extrusive interaction and/or intrusive interactions and/or a time bound change based interaction and/or a real environment mapping based interaction and combination thereof, as per user choice and/or as per characteristics, state and nature of the said object;

The time bound changes refers to representation of changes in 3D model demonstrating change in physical property of real object in a span of time on using or operating of the object, and real environment mapping based interactions refers to capturing a real time environment, mapping and simulating the real time environment to create a simulated environment for interacting with the 3-D model. The extrusive interaction includes interacting with a virtual operating sub-system of said 3D-model for experiencing functionality of operation of displayed 3D-model.

According to another embodiment of the method, wherein the object is a graphical user interface based object.

According to yet another embodiment of the method, wherein the extrusive interaction comprises interacting with 3D-model of object for rotating the model in 360 degree in different planes.

According to one embodiment of the method, wherein the extrusive interaction comprises interacting with light-emitting parts of 3D-model of object.

According to another embodiment of the method, wherein the extrusive interaction comprises interacting with 3D-model having electronic display parts for understanding electronic display functioning.

According to yet another embodiment of the method, wherein the extrusive interaction comprises interacting with 3D model for producing sound effects.

According to one embodiment of the method, the intrusive interactions includes interacting with sub-parts of the 3D model of the object, wherein sub-parts are those parts of the 3D-model which are moved and/or slided and/or rotated and/or operated for using the object.

According to another embodiment of the method, the intrusive interactions includes interacting with internal parts of the 3D model, wherein the internal parts are those parts of the 3D-model which are not required to be interacted for operating the object but responsible for working of object.

According to yet another embodiment of the method, wherein interacting with internal parts includes removing/disintegrating/operating/rotating of the internal parts.

According to one embodiment of the method, wherein intrusive interaction includes disintegrating different parts of the object in exploded view.

According to another embodiment of the method, wherein the real environment mapping based interactions includes capturing an area in vicinity of the user, mapping and simulating the video/image of area of vicinity on a surface of 3D model.

According to yet another embodiment of the method, the method includes loading and simulating 3D-model of the said object in real-time, which further includes using image associated data of said object, and auto-linking with real object associated data, polygon data and texturing data of the said object in a simulative manner; and transforming the linked polygon data, texturing data, image associated data and real object associated data into 3D-model of the said object.

According to one embodiment of the method, wherein displaying of 3D model of the said object by routing the 3D model either directly, or through a consolidated-view category or via live telecast category. The consolidated-view category emulates place containing objects, and live telecast category refers to live feed of a video of a place having the objects after processing the video to make objects clickable to show 3d model representing the object.

According to another embodiment of the method, wherein the consolidated-view category comprises an interactive video view category or an interactive panoramic view category. The interactive video view category refers to interactive video of place having clickable 3D object to display 3D model of object, and the interactive panoramic view category refers to panoramic view of a place having the object are clickable to display 3D model of interactive object.

According to yet another embodiment of the method, wherein the consolidated-view category includes a virtual assistant sub-system for receiving an input for providing information about 3D object available in consolidated-view category. The virtual assistant sub-system includes a image processing or 3D animation based talking character with realistic facial and body expression and which can answer the users query using artificial intelligence.

According to one embodiment of the method, the virtual assistant sub-system is placed as overlay in the consolidated-view.

According to another embodiment of the method, the virtual assistant sub-system is intact at one position in the consolidated-view.

According to yet another embodiment of the method, wherein the realistic 3D-view is preferably displayed initially, and wherein at least one of a pressure view, a taste view, a temperature view, and a touch view is available, and displayed on request as per characteristics, state and nature of displayed object. The pressure view is for judgment of pressure required to operate the said displayed object. The taste view is to judge sense of taste. The temperature view is for judging heat generated during operation of the said displayed object after certain time intervals. The touch view is for judging the sense of softness touch when applied on the displayed object.

According to one embodiment of the method, wherein the pressure view, the temperature view and the touch view while operating part/s of 3D-model or a 3D model as a whole is represented by texturing the parts or entire 3D-model in different color.

According to another embodiment of the method, wherein the input mode is selected from one of a pointing device such as mouse; via a keyboard; a gesture guided input of hand or eye movement or voice command captured by a sensor of an system; a touch input; a command to a virtual assistant sub-system, According to yet another embodiment of the system, where command to the said virtual assistant system can be a voice command or via chat, wherein virtual assistant sub-system includes a natural language processing component for processing of user input in form of words or sentences and providing output as per the received input.

According to one embodiment of the system, wherein enhanced object viewing and interaction experience can be provided over a web-page via hypertext transfer protocol in a wearable or non-wearable display, or as offline content in stand-alone system or as content in system connected to network.

According to another embodiment of the system, where a dynamic link is built over each identified object, where each dynamic link invokes a 3D-model displayer for displaying 3D-model of the said identified object, wherein the link built over each identified object in a live telecast displayer is a dynamic link built in real time during live video telecast of a remote place or a link built with a lag time.

BRIEF DESCRIPTION OF THE DRAWINGS

FIG. 5a-e shows perspective views of 3D-model of refrigerator depicting another example of intrusive interaction according to a preferred embodiment of invention;

FIG. 6a-c shows different schematic views of 3D-model of a laptop showing intrusive interaction using a virtual operating sub-system according to invention;

FIG. 8a-f shows different perspective views of a realistic 3D-simulation of a chair with its touch view for judging softness of seat and back cushion in an intrusive interaction according to invention;

FIG. 9a-d shows in a schematic view virtual simulation of 3D-model of a liquor bottle in a taste view according to according to an embodiment of invention;

FIG. 10a-c shows schematic view of different frames of an continuous user-controlled 3D simulation and interaction with a 3D-model of a toothpaste tube showing paste coming out of the tube in intrusive interaction according to invention;

DETAILED DESCRIPTION

Figure 1:
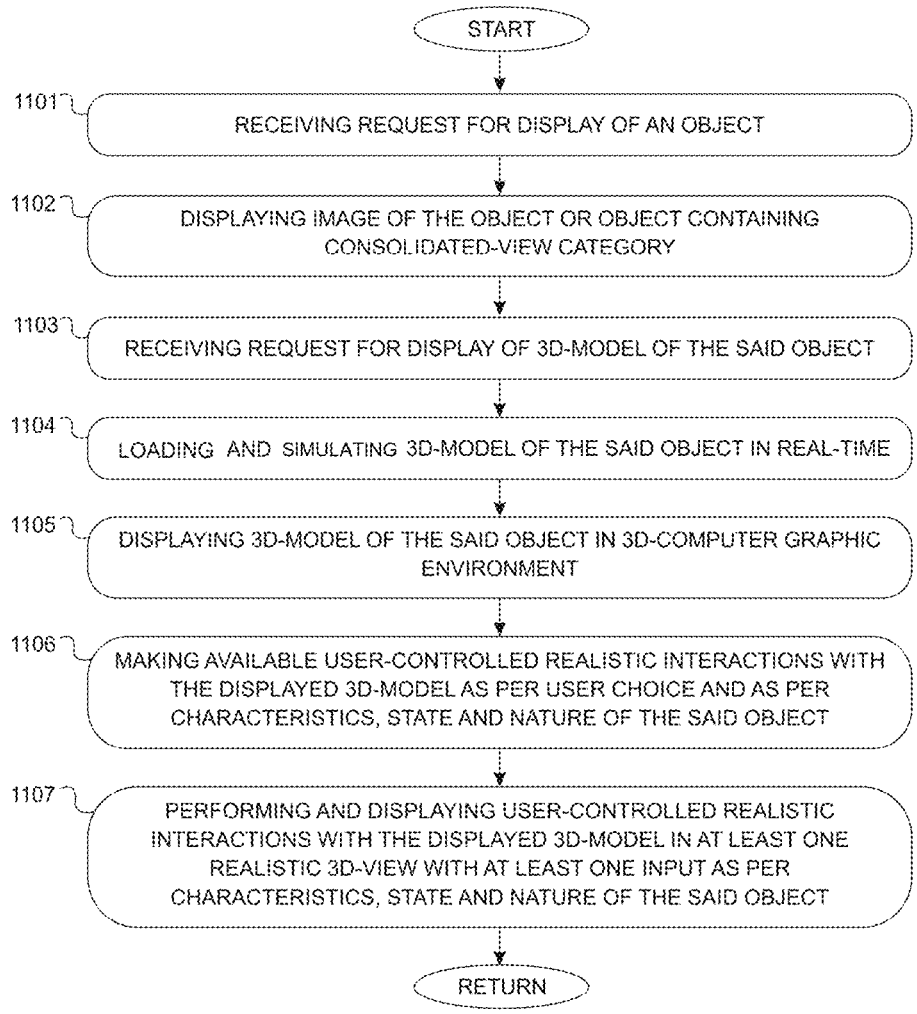
FIG. 1 shows a flowchart illustrating the method of user-controlled realistic simulation and interaction for enhanced object viewing and interaction experience according to invention.

FIG. 1 shows a flowchart illustrating the method of user-controlled realistic simulation and interaction for enhanced object viewing and interaction experience. Step 1101, involves receiving request by any one input mode for display of an object. In step 1102, an image of the said object or object containing consolidated-view category is displayed. In step 1103, a second request is received by any one input mode for display of 3D-model of the said object, which is followed by loading and simulating of 3D-model of the said object in real-time in step 1104. A virtual operating sub-system may be installed in the loaded 3D-model based on characteristics, state and nature of the said object. For example, If the requested object is a computer or laptop, smart phone or any computing device, a virtual operating system is also loaded and installed within the loaded 3D-model such as within simulated 3D-model of laptop based on product or brand characteristics such as if an windows version operating system was present in the real product specification, a virtual operating system pertaining to the said windows version style operating system will load accordingly in real time and as per state and nature of the desired object. The characteristics, state and nature of displayed object means the loaded object are displayed and the interactions available are as per their real characteristics and nature in reality. The characteristics, state and nature of the object includes the real object properties such as single part object, multi-part object, digital or communication devices such as laptop, smart phones, and computers, solid, liquid, semi-solid, gaseous object state properties, or operation status such as object in opened state or closed state etc. By nature of the object, it means expected behaviour and the purpose of the object. One cannot expect in real setup to disintegrate a single part object or judge the taste view of car. For example if the desired object is a iron, testing its heating property is justified, and not the coldness as for this object expected behaviour and the purpose of the object is producing heat for pressing clothes. The step of generation of 3D-model of the said object involves: a) using image associated data of said object, and auto-linking with real object associated data such as characteristics, state and nature of said object, polygon data and texturing data of the said object in a simulative manner; and b) transforming the linked polygon data, texturing data, image associated data and real object associated data into 3D-model of the said object. In step 1105, displaying 3D-model of the said object in 3D-computer graphic environment is carried out, where the displayed 3D-model of the said object comprises at least one realistic 3D-view. The realistic 3D-view is first realistic 3D-view, a pressure view for judgment of pressure required to operate the said displayed object, a taste view to judge perception of sense of taste, a temperature view for judging heat generated during operation of the said displayed object after certain time intervals, a touch view for judging the sense of softness touch when applied on the displayed object. The first realistic 3D-view is displayed by default. The pressure view, the taste view, the temperature view, the touch view are available, and displayed on request, as per characteristics, state and nature of displayed object. The pressure view is for solid objects which can be operated, e.g. a refrigerator, gasoline generator or hand pump. The taste view is available for food items, emulating real life scenario. The taste views helps in judging the taste of object and compare the taste with other objects showing the extent of bitterness, sweetness, sourness, saltiness, emami taste or as per food in question. The temperature view helps to see the temperature change for objects in real set-up dealing with temperature e.g. refrigerators, air conditioners, iron, any electronic devices as they generate heat after prolonged operation in real set-up. The touch view helps in ascertaining softness and smoothness through colour representations making available another parameter of judgment available for comparison. The properties of heating, cooling, softness, hardness and pressure applied to open or operate a movable sub-part of multi-part 3D-model is represented by texturing the 3D-model in different colour, where different pressure, temperature, softness or hardness is distinguished at different sub-parts of said 3D-model or entire 3D-model in different colours. In step 1106, user-controlled realistic interactions with the displayed 3D-model are made available to user. The user-controlled realistic interactions include extrusive interaction and/or intrusive interactions and/or time bound changes based interaction and/or real environment mapping based interactions as per user choice and as per characteristics, state and nature of the said object. The extrusive interaction is interaction possible from exterior of any real objects. The extrusive interaction with 3D-model emulates real life scenario with regards to viewing or examining the object. On receiving input for viewing the object in different angles, as per user choice, the 3D-model of object/s is rotated in 360 degree in different planes. The said object is displayed as per received input. In extrusive interactions, simulating parts of 3D-model of a multipart object/s is made possible as per user choice. The simulation is displayed such that viewing, examining and testing object functionalities or product features is made possible in real-time with precision, where polygons along with associated texture of said 3D-model moves as per user command, and movement of 3D-model or its parts is achieved and displayed in real time and with precision based on user input commands. The intrusive interaction includes viewing and examining internal parts, disintegrating parts of the object in real-time one by one to examine interior and individual parts of the said object. The polygons along with associated texture of said 3D-model moves as per user command, and movement of 3D-model or its parts is achieved and displayed in real time and with precision based on user input commands. The movement of 3D-model or its parts is achieved and displayed in real time, and with precision based on user input commands as per characteristics, state and nature of displayed object. The time bound changes based interactions comprises monitoring or visualizing time-bound changes observed on using or operating an object. User can check product or object behaviour after a desired duration. For example checking the heating of iron, or cooling in refrigerators, or cooling generated by air conditioners in a room is possible. Further, user can hear the sound when a refrigerator door is opened from a virtual simulation of 3D-model of object which mimics the real sound produced when opening the door of a real refrigerator in real setup. Further change in sound after certain intervals of time can be heard or monitored to experience the product performance, or to compare it with other product. The pressure view, the taste view, the temperature view and the touch view interactions are also included in the time bound interactions. The real environment mapping based interactions comprises of interactions where user environment, that is the place or location in the vicinity of user, is captured through a camera, mapped and simulated in real-time such that a realistic 3D-model or virtual object displayed on electronic screen of user can be seen interacting with the mapped and simulated environment. In step 1107, user performs user-controlled realistic interactions with the displayed 3D-model by providing at least one input, where performed interactions are displayed in at least one realistic 3D-view.

Figure 2A:
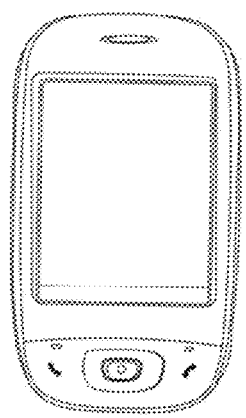
FIG. 2a-h and FIG. 3a-f show different schematic and perspective views of 3D-model of mobile depicting extrusive and intrusive interactions according to an preferred embodiment of invention.
Figure 2B:
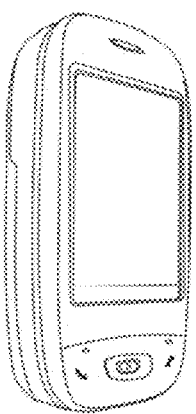
Figure 2C:
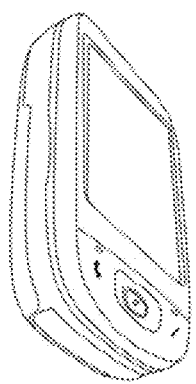
Figure 2D:
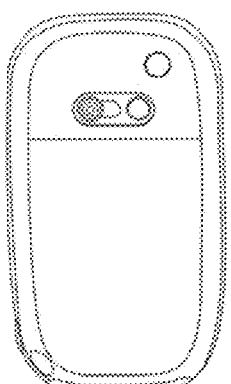
Figure 2E:
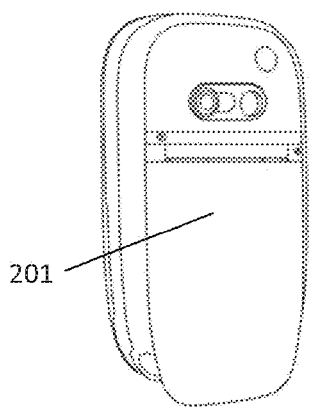
Figure 2F:
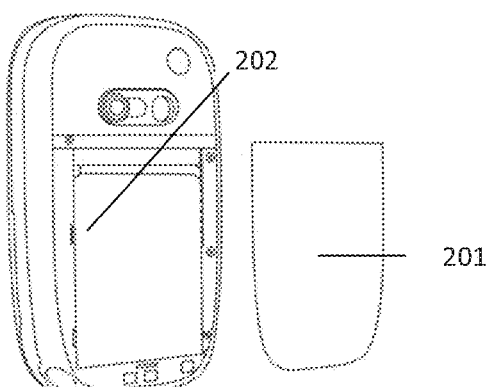
Figure 2G:
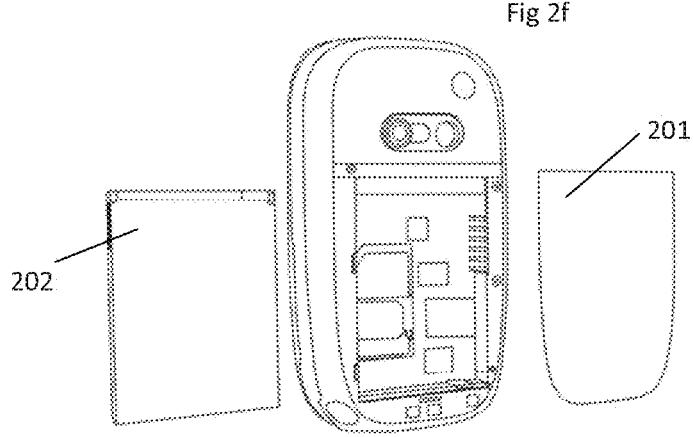
Figure 2H:
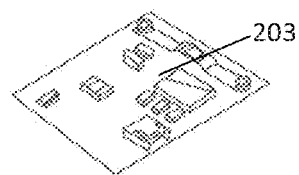
Figure 3A:
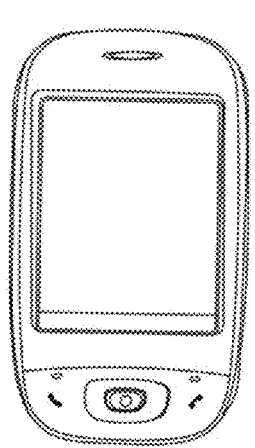
Figure 3B:
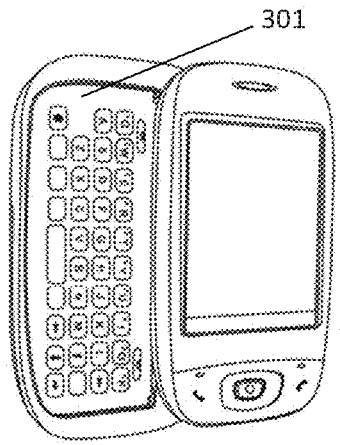
Figure 3C:
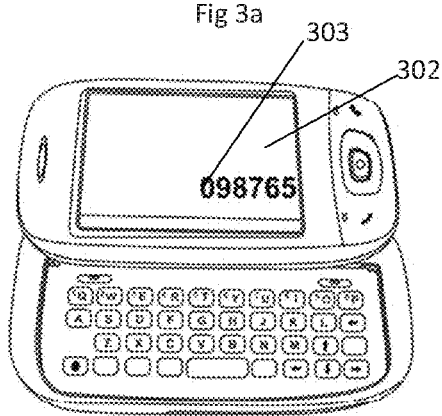
Figure 3D:
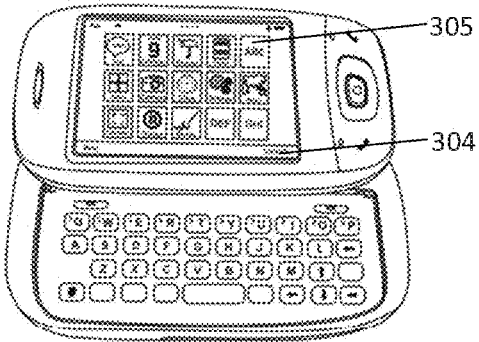
Figure 3E:
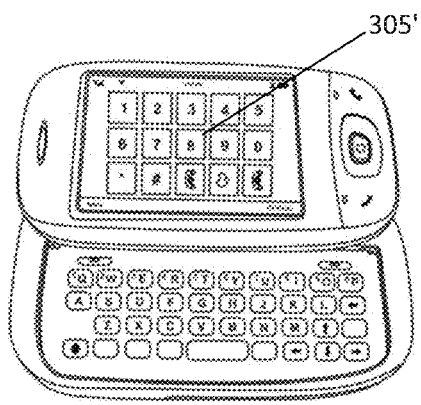
Figure 3F:
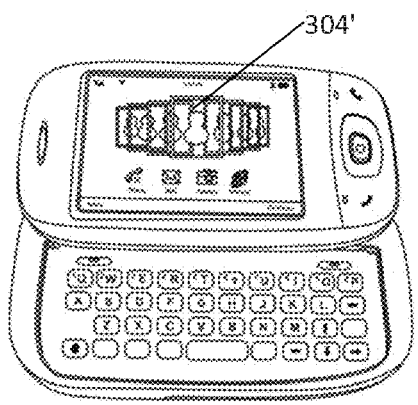
Figure 23:
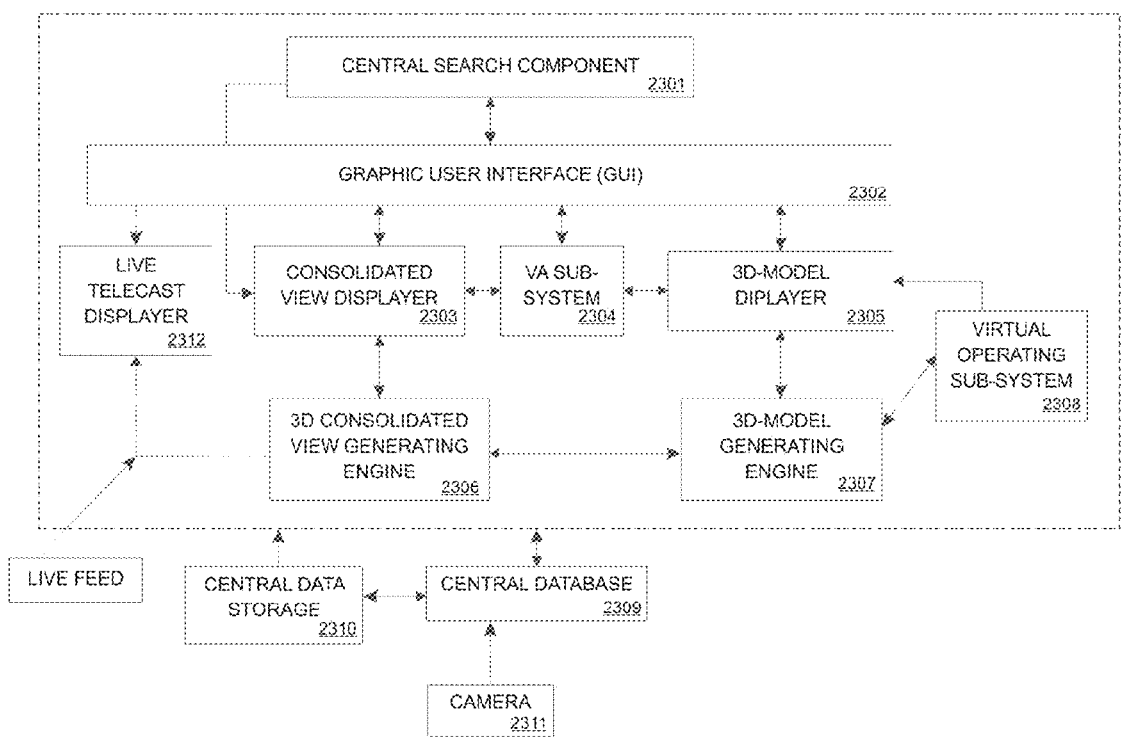
FIG. 23 shows a system of user-controlled realistic simulation and interaction for enhanced object viewing and interaction experience according to invention.

FIG. 2*a-h* and FIG. 3*a-f* show 3D-models of mobile in various extrusive and intrusive interactions. FIG. 2*a*-2*d* shows rotation of 3D-model of mobile in more than one plane as per user choice and in real-time. The 3d-model of mobile can be rotated by user in any angles in its 360 degree course to return to its original position. Users desiring to check battery size and internal components can perform intrusive interactions such as opening a back cover 201 shown in FIG. 2*e*, further taking out mobile battery 202 in real-time to see dual SIM layout in the said 3d-model as shown in FIG. 2*f-g*. Further, if user desires to further check and inquire about other internal components 203 of mobile, the user can open the mobile and check 3d-model of the sub-part as shown in FIG. 2*h*, or ask a virtual assistant sub-system to gain active product information. FIG. 3*a-f* shows user interacting with the 3D-model of mobile, where the user not only views the mobile but also is able to interact intrusively by sliding the mobile to check numeric keypad 301, pressing number keys, where the numbers pressed 303 is reflected real time in mobile screen 302 of 3D-model of the said mobile. The user can check all functions in virtual 3D-space of a 3D-model displayer 2305 as shown in FIG. 23. The said user can interact with the 3D-model of mobile simulated just like real setup, such as to open message, see contact list, press buttons, use camera virtually very similar to what we do with real mobile. In FIG. 3*d*, on pressing contact 304, contact page 304' is displayed in interactive manner using a virtual operating subsystem 2308 as shown in FIG. 23 of a system. Similarly, by providing an input 305 desiring to interact to view operation of touch numeric keypad, an on-screen numeric keypad 305' is displayed in the said 3D-model mimicking the functionalities of real mobile, which would have been operated in physical set-up. The interactions displayed are not the only interactions possible. The user can do numerous interactions as per his desire and the interactions possible holding a mobile in hand. The user can further see the exploded view of the mobile parts, or disintegrate parts one by one such as taking out SIM slot, opening front cover, judging smoothness of mobile body, or switching on to judge the start time, processing speed, operate the mobile to check functionalities etc mimicking real-setup. Other extrusive interactions can be lighting effect for light-emitting parts of 3D-model of object, interacting with 3D-models having electronic display parts for understanding electronic display functioning and sound effects emulating real scenario.

Figure 4:
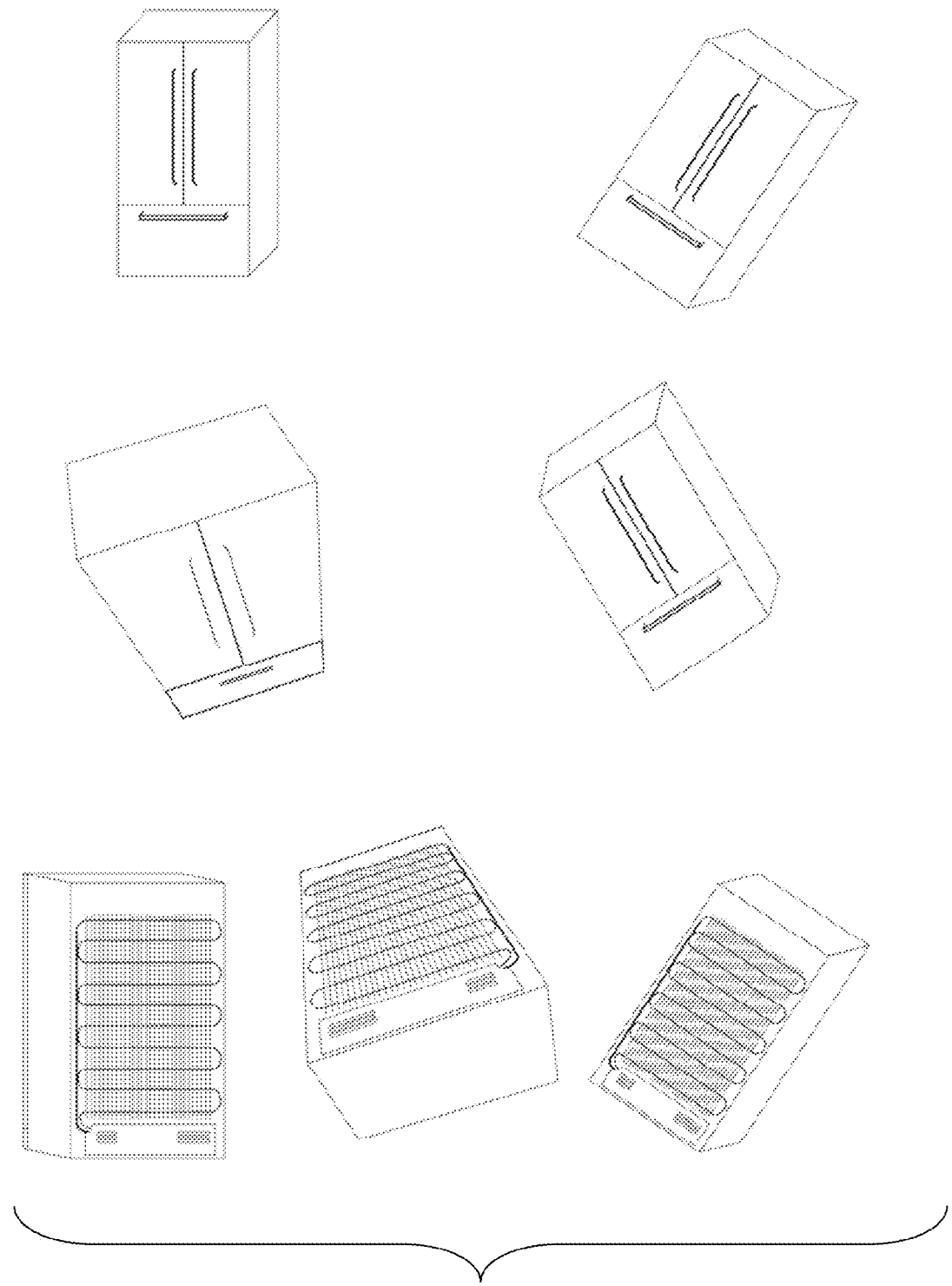
FIG. 4 shows different perspective views of 3D-model of a multi-part object such as refrigerator depicting extrusive interaction in 360 degree in more than one plane according to an preferred embodiment of invention.

FIG. 4 shows different perspective views of 3D-model of a refrigerator, where extrusive interaction of rotation is performed. In FIG. 4, realistic rotations in various angles are shown to be carried out with help of a pointing device such as mouse cursor movement. All rotations in 360 degree in all planes are possible using any conventional input devices such as keyboard, pointing device. The virtual assistant sub-system can also be used as input mode for requesting in the form of voice command or chat in natural language such as English. Further, in FIG. 5*a*-5*e*, perspective views of the same 3D-model of the refrigerator is shown as another example of intrusive interaction, where when the user provides input like click on movable-part such as doors 501,502 for opening closed doors of simulated 3D-model, the user gets a view of opening of doors 501',502' in a continuous movement simulation such as in animation as shown in FIG. 5*b*, emulating real scenario. Further, if user desires to further investigate lower portion of refrigerator, the user can open lower drawer 503 of the 3D-model by clicking on its lower movable part, the drawer in a continuous movement, where this operation can be performed on already first 3D-model simulation of opened door as shown in FIG. 5*b* that was performed earlier. A real-time 3D-simulation of the opened drawer 503' is generated and presented before the user as seen in FIG. 5*c*. The user can upload his own photograph to generate a virtual simulation of himself 504,504' representing self. The simulated human 3D-model can walk as per his desire to a showroom or directly visit a product. The simulated human 3D-model can not only walk and experience a different virtual world but can see himself operating the product. Here, the human 3D-model is shown walking to the 3D-model of refrigerator, to open door 501" of displayed 3D-model of refrigerator himself. The lights in the refrigerator will also turn-on on opening the door, and cooling can also be experienced virtually mimicking the real life set-up. The interactions displayed are not the only interactions possible. For example, user instead of uploading his own photograph for simulating virtual 3D-model of himself, can also select virtual avatars, where the avatar/s selected can do interactions such as walking towards the product or a product showroom experiencing a different virtual world, and also operating the product. Even pressure applied to open the door by the user can be judged using another operating pressure view. This view calculates the pressure and displays using available standard metrics to calculate energy or pressure. This can be compared with other objects so as to get better informed to decide choosing of a product emulating a real scenario in real set-up. The sound of the refrigerator door opening, if any as per the real product can be heard through conventional sound devices such as a speaker connected with the system, where display of 3D simulation is carried out.

FIG. 6*a-c* shows different schematic views of 3D-model of a laptop showing intrusive interaction with a virtual operating sub-system (OS). FIG. 6*a* shows virtual simulation of 3D-model of a laptop schematically in power-off mode. A user can not only check the laptop looks and compare specification, but can operate the laptop just in real life scenario such as switching it to judge start-up time, which is the real start-up time for the said product, if the product would have been started in real life set-up. The virtual operating sub-system (OS) is shown loaded within the 3D-model of the laptop. FIG. 6b shows schematically realistic simulation of a laptop, starting 601 with the help of the virtual operating sub-system (OS). The virtual operating sub-system is built with artificial intelligence and realistic 3D-simulation and interaction technology. The virtual operating sub-system (OS) mimics the real operating systems loaded in the existing systems or computers or any computing devices for operation such that hardware of the displayed virtual simulation of 3D-model of a laptop can be operated through the virtual operating sub-system. FIG. 6c shows started virtual operating sub-system ready for user login such that system booting time can be estimated virtually such as in real scenario.

Figure 7A:
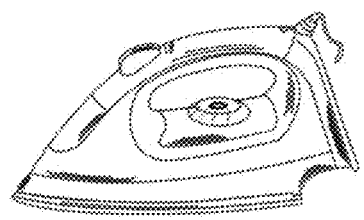
FIG. 7a-h shows schematically a temperature view of simulated 3D-model of iron, depicting heating of iron lower surface at different time intervals as per time-bound changes based interactions according to an embodiment of invention.
Figure 7B:
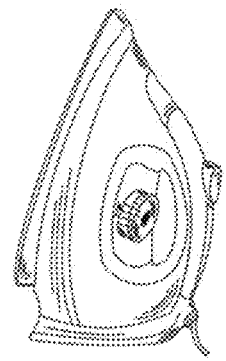
Figure 7C:
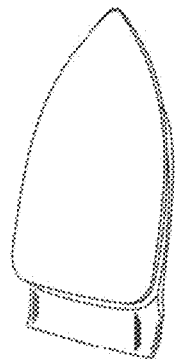
Figure 7D:
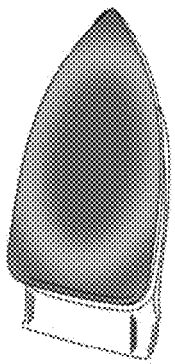
Figure 7E:
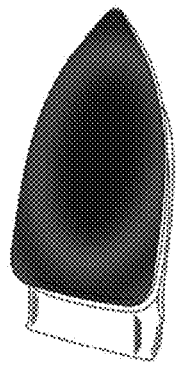
Figure 7F:
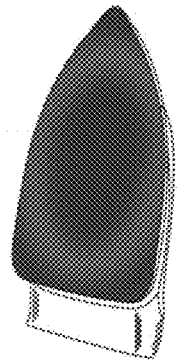
Figure 7G:
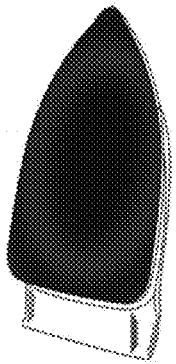
Figure 7H:

FIG. 7a-h shows schematically a temperature view of simulated 3D-model of iron. FIGS. 7a and 7b shows different views of iron, FIG. 7c-e depicts heating of iron lower surface at different time intervals as per time-bound changes based interactions. The simulation of 3D-model of iron here is shown schematically. A temperature adjusting knob, when set to a particular temperature mode such as cotton, which is a high temperature mode, the heating interactions begins emulating real scenario. The heating generated in the iron is ascertained by colour coding from light to dark shades representing low to high temperature respectively as shown in FIG. 7h and can be displayed in standard metrics such as degree, Celsius or Fahrenheit in a particular time interval (not shown in figure). After 1.5 minutes of operation, say the iron heats to 70 degree Celsius of temperature. As shown in FIGS. 7f and 7g, the value comes when two 3D-models of different products are compared for temperature at same time say one minute after operation, and see the difference in generated temperature in real-time without actually having to operate the iron, which might not be possible or allowed in real set-up.

FIG. 8a-f shows different perspective views of a realistic 3D-simulation of a chair with its touch view for judging softness and hardness of seat and back cushion in an intrusive interaction. The chair in FIGS. 8a and 8c transforms to another view as shown in FIGS. 8b and 8d, represented in shades of colours in touch view to depict softness of seat, and cushion. The softness can be colour coded from light to dark shades as shown in FIGS. 8e and 8f or in colour coded in different distinguishing colours representing very soft, soft to hard surfaces respectively, or an index is displayed in numerical standard allowing comparison of products with the parameter of softness or smoothness.

FIG. 9a-d shows schematic view of virtual simulation of 3D-model of a liquor bottle in a taste view. FIG. 9a-c shows different view of the liquor bottle with liquor inside the bottle to being spilt. When a user selects a taste view for food items such as liquor in this embodiment, taste types is displayed as shown in FIG. 9d mimicking the brand taste for which object is displayed. This feature of invention goes beyond the real-setup scenario, as in real scenario, users before buying a product cannot open the bottle or taste the product. The user can also open cork of the bottle, or pour the liquid from the simulated of 3D-model bottle emulating real scenario.

FIG. 10a-c shows schematic view of different frames of a continuous animation of virtual simulation of 3D-model of a toothpaste tube showing paste coming out of the tube in an intrusive interaction. The cap of virtual simulation of 3D-model of toothpaste tube is opened, and the tube is pressed to squeeze out paste. The paste color can also be observed together with the exterior body of the paste tube. The strength required to press the tube can also be judged and compared with another paste of different product or brand, where the characteristics, state and nature of product is same as of the real product in real store.

Figure 11:
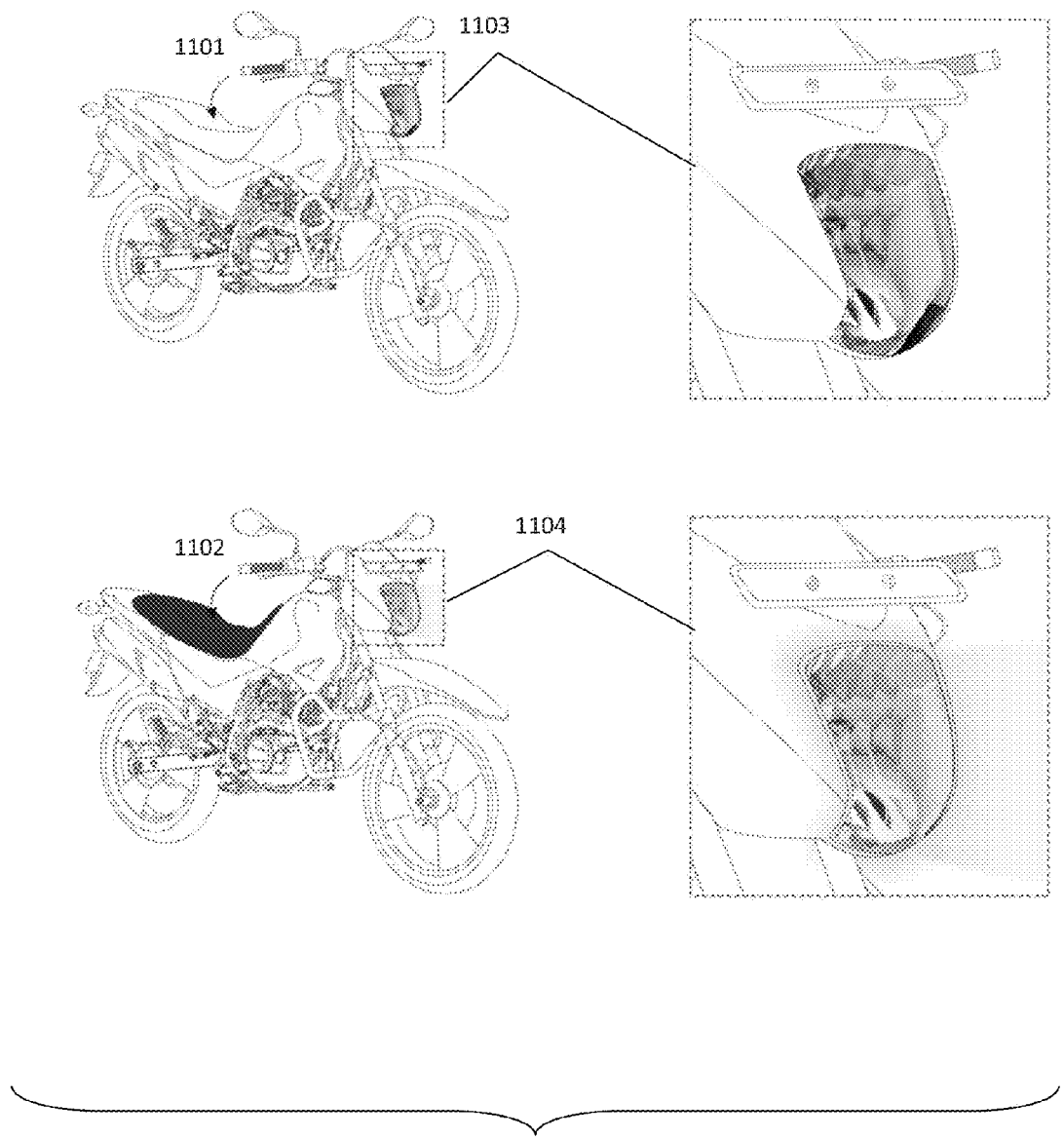
FIG. 11 shows perspective views of 3D-model of a bike depicting an example of intrusive interactions of seat change and extrusive interaction of lighting effect as per user choice according to invention.
Figure 12A:
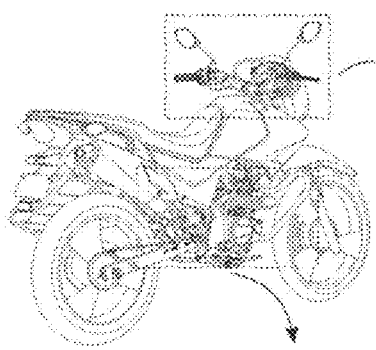
FIG. 12a-c shows perspective and partial enlarged views of 3D-model of the bike of FIG. 11 depicting operating pressure view as an example of intrusive interactions according to invention.
Figure 12B:
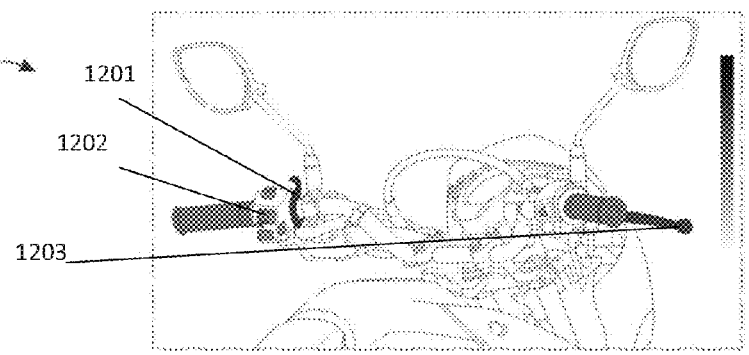
Figure 12C:
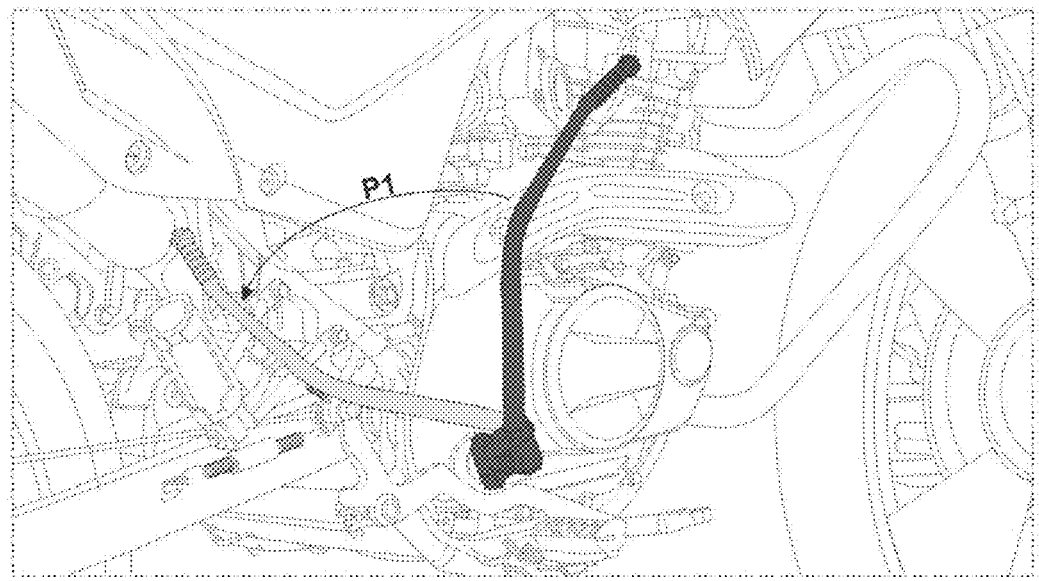
Figure 13:
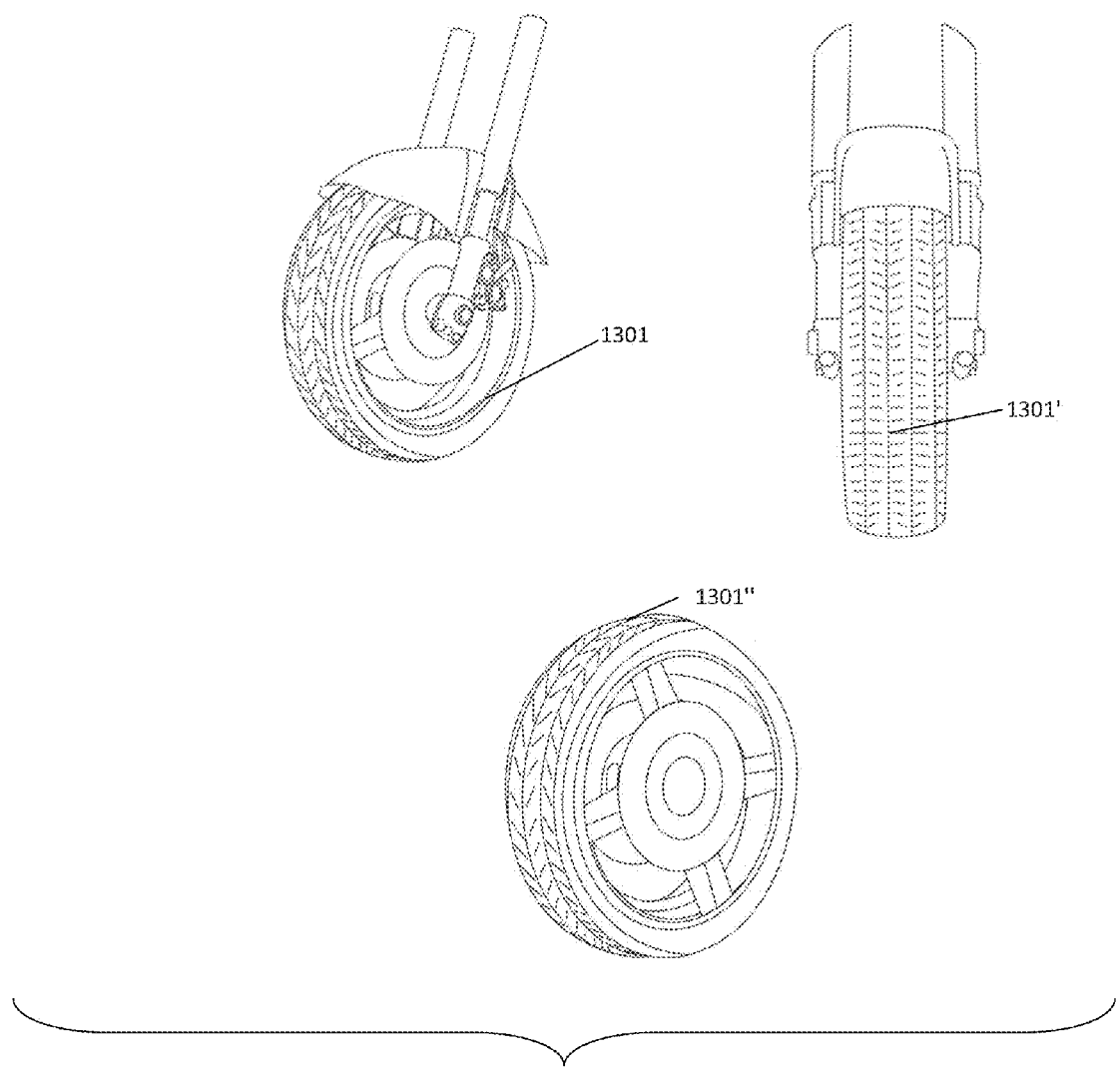
FIG. 13 shows further intrusive interactions for the 3D-model of the bike of FIG. 11, where some parts of the 3D-model have been disintegrated as per user choice according to invention.

FIG. 11 shows perspective views of 3D-model of a bike depicting an example of intrusive interactions of seat change and extrusive interaction of lighting effect as per user choice, where a part of a 3D-model can be opened, exchanged or changed for another part of similar nature in different colour or shape as per user choice. Here, seat 1101 of the 3D-model of a bike is a sub-part of multi-part object bike, which is changed to different coloured seat 1102 to match with the body of the bike as per user choice performing an intrusive interaction virtually. The 3D-model of a bike can also been seen in pressure view to judge operating pressure of its parts. FIG. 12a-c shows perspective and partial enlarged views of 3D-model of the bike of FIG. 11. FIG. 12a depicts pressure view, where pressure or force required to operate a brake is shown in FIG. 12b or operation of a kick as shown in FIG. 12c can be judged either by color shade differentiation in an intrusive interaction. A pressure (p1) generated while operating the kick is shown in FIG. 12c. The user can further check individual parts of the 3D-model of the bike as shown in FIG. 13, where some parts such as wheel 1301,1301',1301", of the 3D-model have been disintegrated as per user choice. The pressure required to open or operate a movable sub-part such as brake clutch 1203, kick, switch 1202, choke 1201 etc. of multi-part 3D-model such as bike in this case is represented by texturing the 3D-model in different colour, as shown in FIG. 12b. A lighting effect 1103,1104 is produced for light-emitting parts of simulated 3D-model emulating real object properties of light, as shown in FIG. 11. In FIG. 11, a light-emitting part such as head-light 1103 is off-mode 1103, where the user desiring to check lighting of head-light can provide input to perform interaction of switching on 1104 the head-light, which is displayed on the simulated 3d-model of bike. Other extrusive interactions includes interactions with 3D-models having electronic display parts for understanding electronic display functioning, where sound effects are produced in realistic way like in real scenario of user performing interactions. The interactions are displayed as per input, with precision, where polygons along with associated texture of said 3D-model moves as per user command, and movement of simulated 3D-model or its parts is achieved and displayed with precision based on user input commands.

Figure 14A:
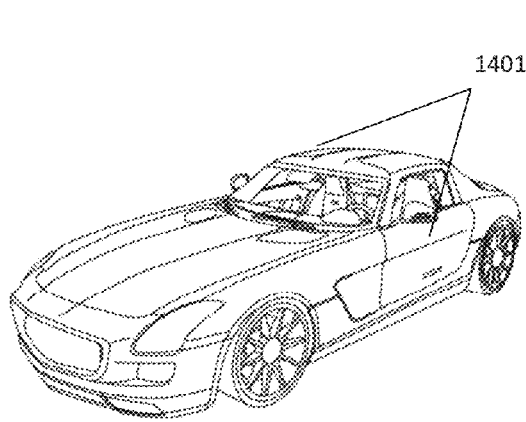
FIG. 14a-c shows perspective views of 3D-model of a car showing another form of intrusive interactions according to a preferred embodiment of the invention.
Figure 14B:
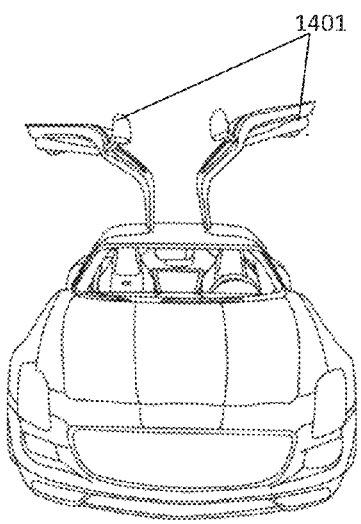
Figure 14C:
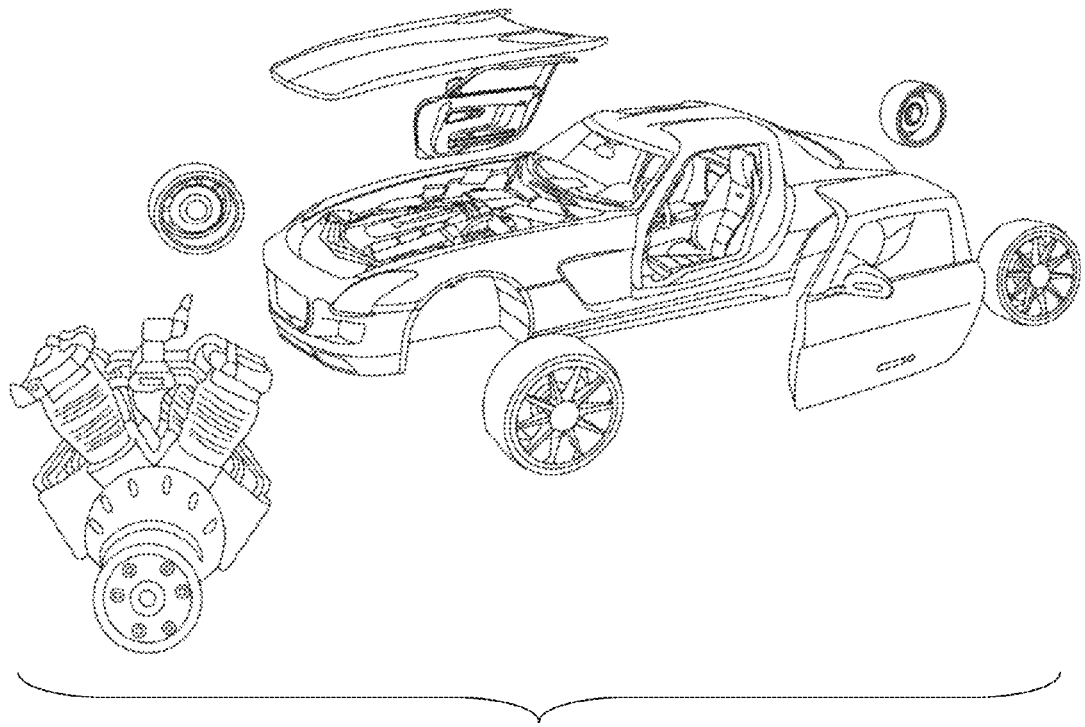

FIG. 14a-c shows perspective views of 3D-model of a car showing another form of intrusive interactions. Doors 1401' of a simulated 3D-model of a car as shown in FIGS. 14a and 14b can be opened in a manner such as in real scenario in true sense. As shown in FIG. 14c, an exploded view of 3D-model of a car can be viewed to introspect each part as per user choice in user-controlled realistic simulation. Further, the steering wheel can be rotated to judge power-steering, smoothness of tyres can be judged, where individual parts are disintegrated in real-time using the user-controlled realistic simulation and interaction technology mimicking the real life scenario. The disintegrated parts, e.g. wheel in this case, are also displayed in 3D-simulation view, where individual parts such as wheel can be rotated separately just like real set-up.

Figures 15A, 15B, 15C:
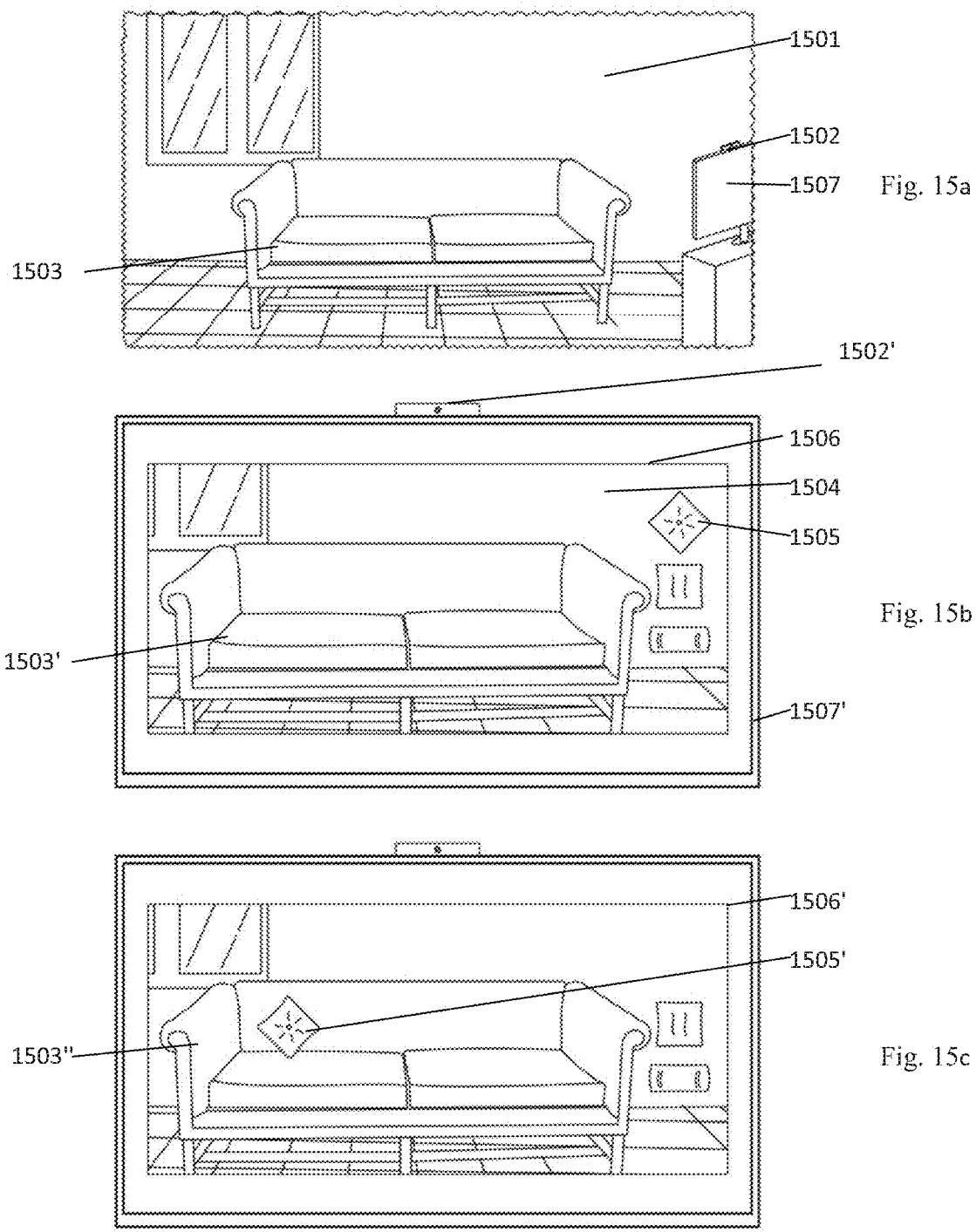
FIG. 15a-c shows schematic perspective views of environment mapping based interactions according to a preferred embodiment of invention.

In FIG. 15a-c, an example of environment mapping based interactions is shown schematically, where in FIG. 15a, a section of a room 1501 with real sofa 1503, and a system with a camera 1502 is shown. The camera 1502' mounted on an electronic screen 1507 captures the video of the room section with the sofa. The captured video 1504 is shown in front side of an electronic screen 1507' in FIG. 15b, where simulated 3D-model of sofa cushion 1505 is also displayed by a 3D-model displayer 1506,1506' for interaction. The user can initiate environment mapping simulation by requesting the virtual assistant sub-system. The virtual assistant sub-system directs camera to capture the video of the section of the room 1501 with real sofa 1503. The desired object that is cushion 1505' is placed over the captured video of sofa 1503' as seen in FIG. 15c interactively in through the 3D-model displayer 1506' to check the compatibility in terms of colour match and aesthetics to make an informed decision to select the cushion or search for different product/cushion as per user choice.

Figure 16A:
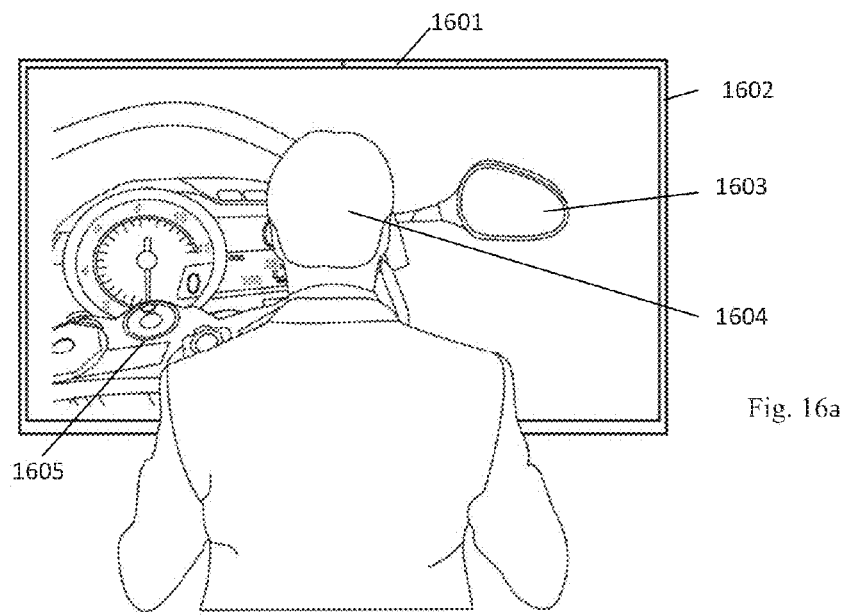
FIG. 16a-b shows mirror effect as another form of environment mapping based interactions according to a preferred embodiment of invention.
Figure 16B:
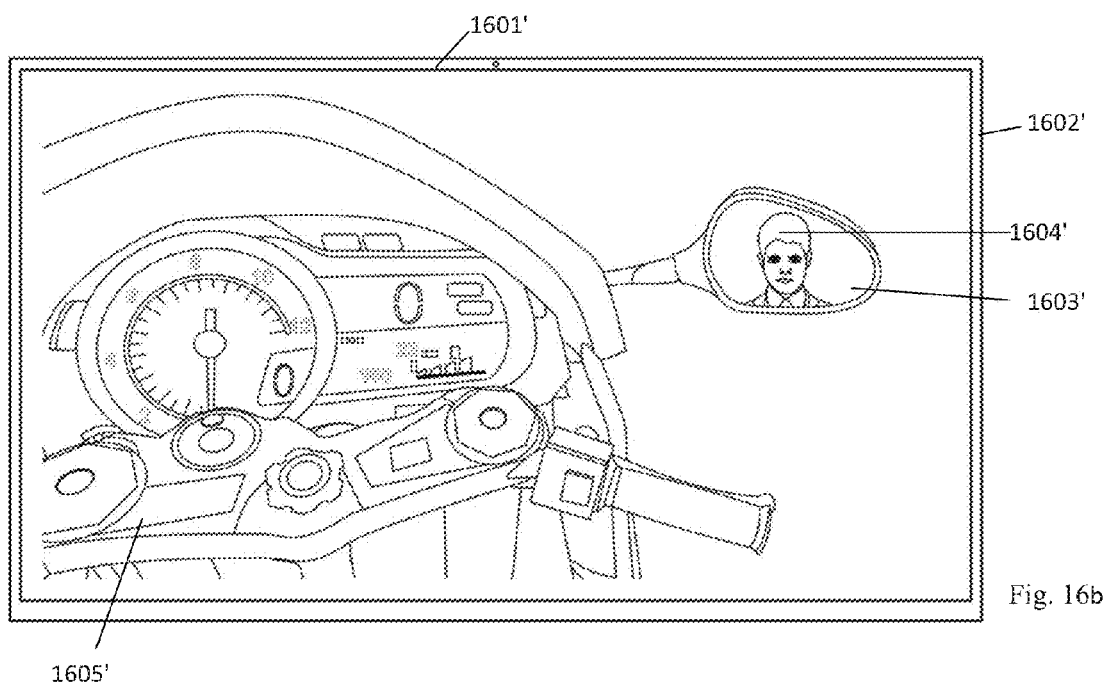

FIG. 16a-b shows mirror effect as another form of environmental mapping based interactions, where in FIGS. 16a and 16b, front top portion of 3D-model of bike 1605,1605' is shown zoomed with a rear view mirror 1603,1603', a front webcam 1601,1601', an electronic screen 1602,1602', and a user 1604 sitting in front of the displayed 3D-model of bike. A reflection 1604' of face of user can be seen on the rear view mirror 1603' of the 3D-model of the bike just like in real scenario. The reflection 1604' is generated in real-time when a user sitting in front of the electronic screen initiates environment mapping simulation through any input mode using a system of user-controlled realistic simulation and interaction. Another example is simulated 3d-model of dressing table producing reflection of user body in the said mirror effect.

Figure 17A:
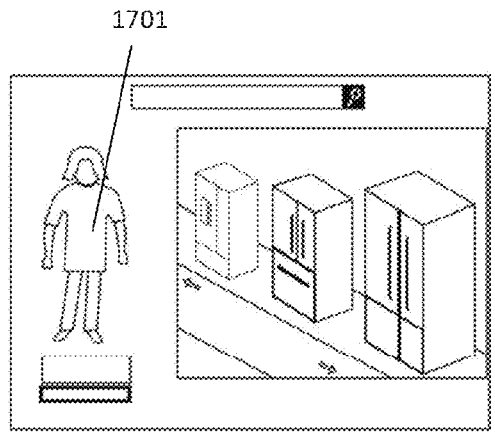
FIG. 17a-d shows different schematic and perspective views of interactive video of 3D-graphics environment model of interior of a refrigerator showroom in a consolidated view category according to an embodiment of invention.
Figure 17B:
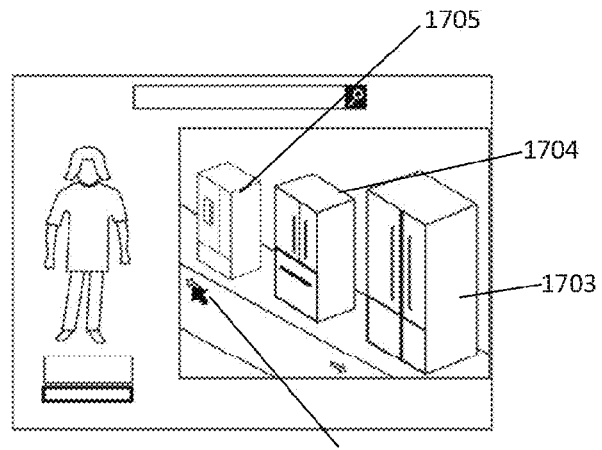
Figure 17C:
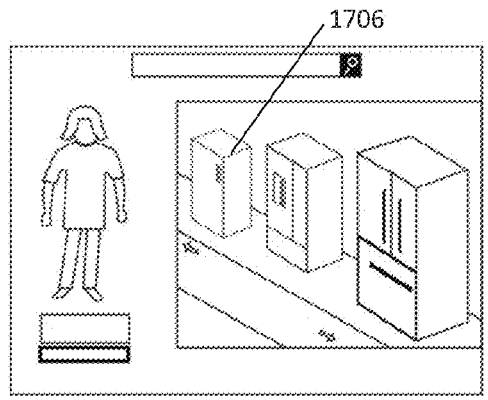
Figure 17D:
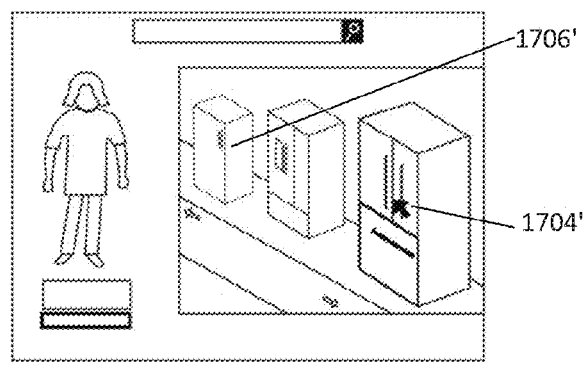

FIG. 17a-d shows different schematic and perspective views of interactive video of 3D-graphics environment model of interior of a refrigerator showroom in a consolidated view category. The virtual assistant is asked to display refrigerator showroom, which is loaded on the right hand side as shown in FIG. 17a. In FIG. 17a, a virtual assistant 1701 is displayed on the left hand side capable of initializing real-time intelligent human-like chatting interaction with real user. 3D-models of different refrigerator 1703,1704,1705 are displayed in an interactive video of interior of 3D computer graphic model of a refrigerator showroom. A mouse cursor 1702 is shown in FIG. 17b, on the click of which on the path, and dragging back, other 3D-models of a refrigerator 1706,1706' are displayed as seen in FIGS. 17c and 17d. FIG. 17d shows that user wants to further introspect the first refrigerator 1703, and hence can request for the display of realistic 3D-model of the selected refrigerator for further user-controlled realistic interactions.

Figure 18A:
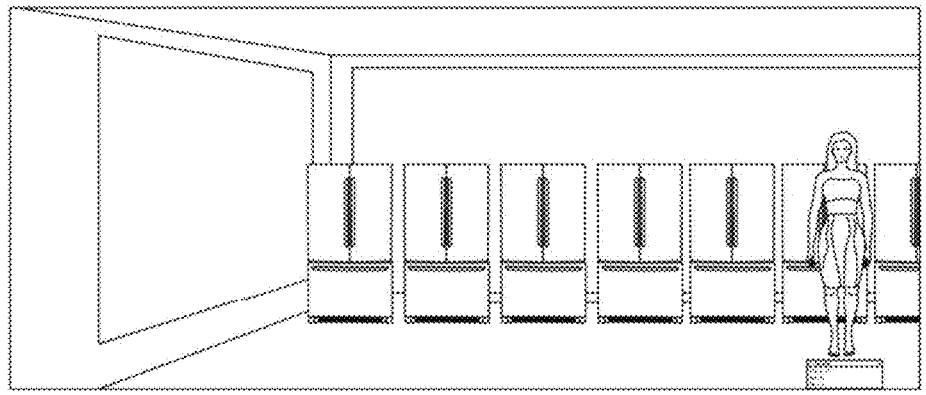
FIG. 18a-c shows a perspective representation of a panoramic view of a 3D-graphics environment model of interior of a refrigerator showroom containing 3D-models of different refrigerators in a consolidated view category according to a preferred embodiment of invention.
Figure 18B:
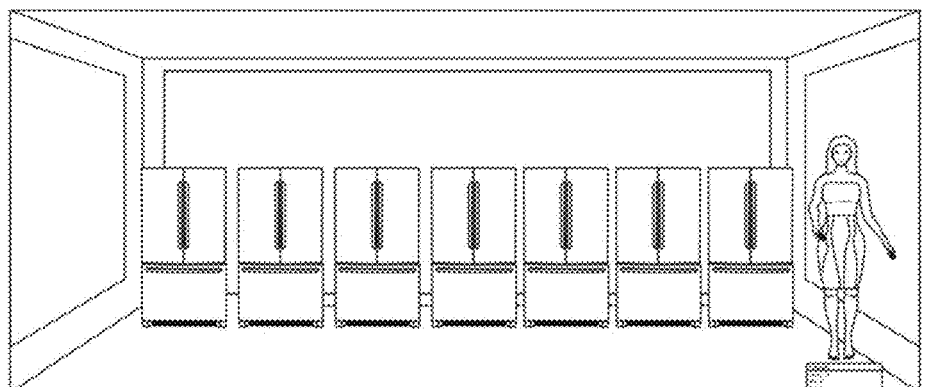
Figure 18C:
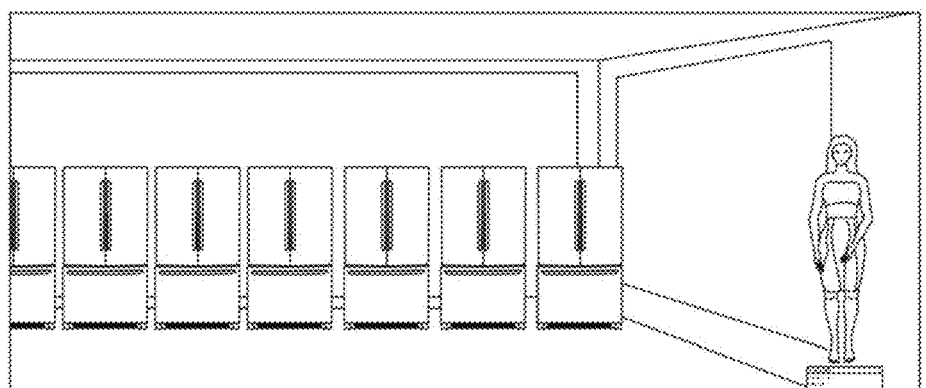

FIG. 18a-c shows perspective representation of a panoramic view of a refrigerator showroom showing different refrigerators in a consolidated view category. The panoramic view category is a 360 degree view of virtual place such as a showroom. The panoramic view is shown in different frames, where the change in continuous motion. The objects such as refrigerator shown in the panoramic showroom are interactive objects, on click of which a 3D-model of refrigerator is loaded, where the 3D-model is capable for generating user-controlled realistic simulation and interactions. The facial expressions, hand movements, mouth movement etc. of the said virtual assistant works in synchronised manner just like real scenario while a real human speaks. The response to user query is and human-like and as per the query of the real human user.

Figure 19A:
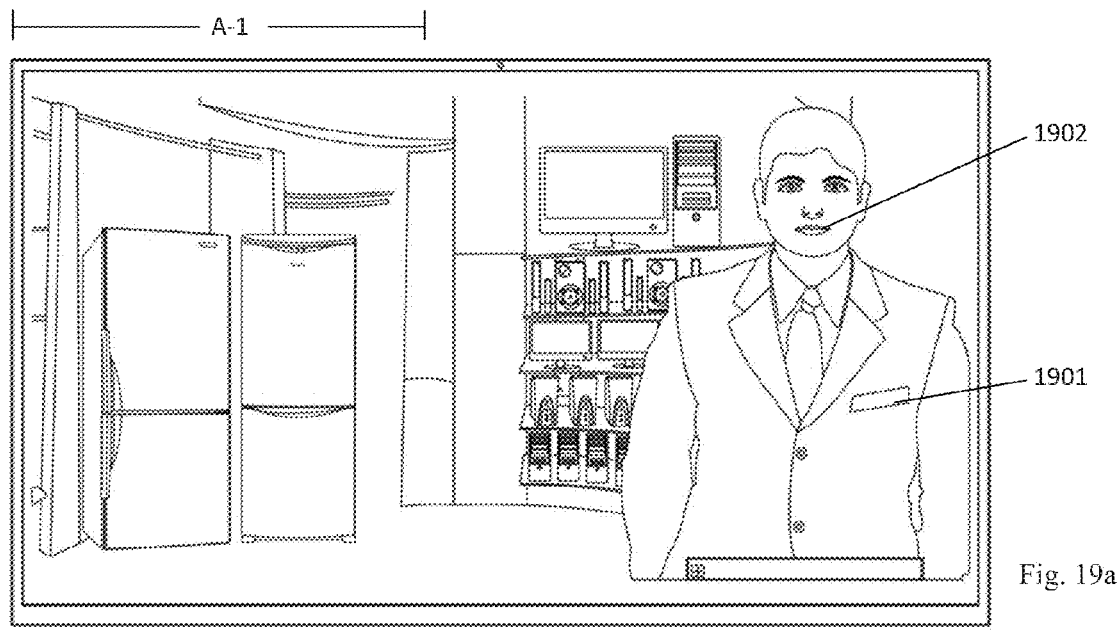
FIG. 19a-b shows a perspective representation of a panoramic view of a 3D-graphics environment model of interior of a refrigerator showroom containing 3D-models of different refrigerators in a consolidated view category with a virtual assistant sub-system according to a preferred embodiment of invention.
Figure 19B:
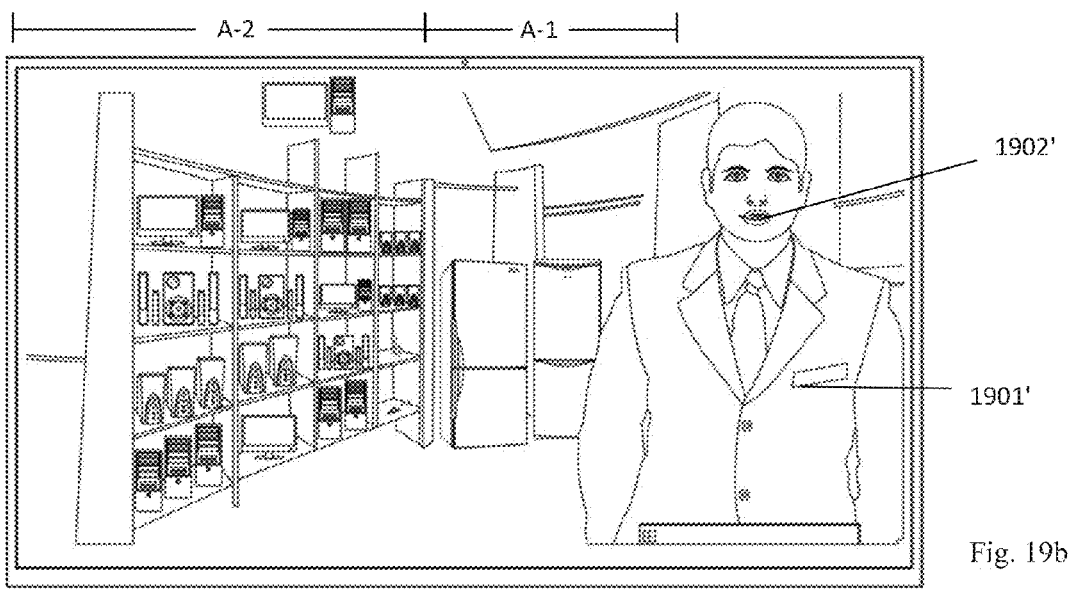

In FIG. 19a-b another perspective representation of a panoramic view of a 3D-graphics environment model of interior of a showroom is shown containing 3D-models of different objects with virtual assistant 1901,1901'. The virtual assistant can also be an image or 3D-model, where the virtual assistant 1901' is shown moving lips in response to a query. When the user moves the panoramic view with area position (A-1) to area position (A-2), the virtual assistant is still intact at its previous position giving improved panoramic image or model viewing experience, which is made possible by synchronised movement using user-controlled realistic simulation and interaction technology.

Figure 20A:
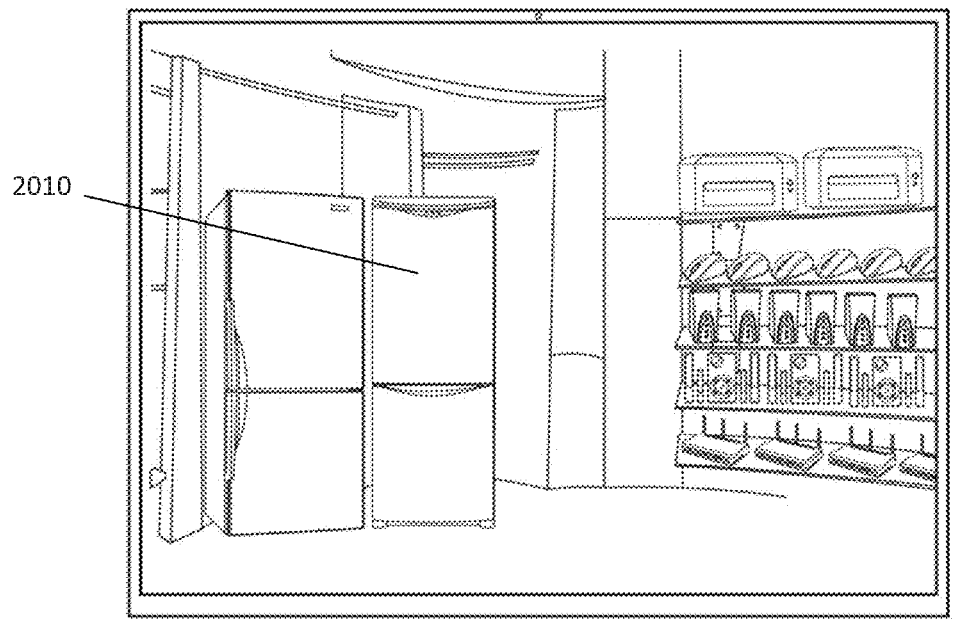
FIG. 20a-b shows schematic and perspective representation of a live telecast of a remote physical shop, where change in object is recognised and dynamic links are built in real-time for display of 3D-models of according to an embodiment of invention.
Figure 20B:
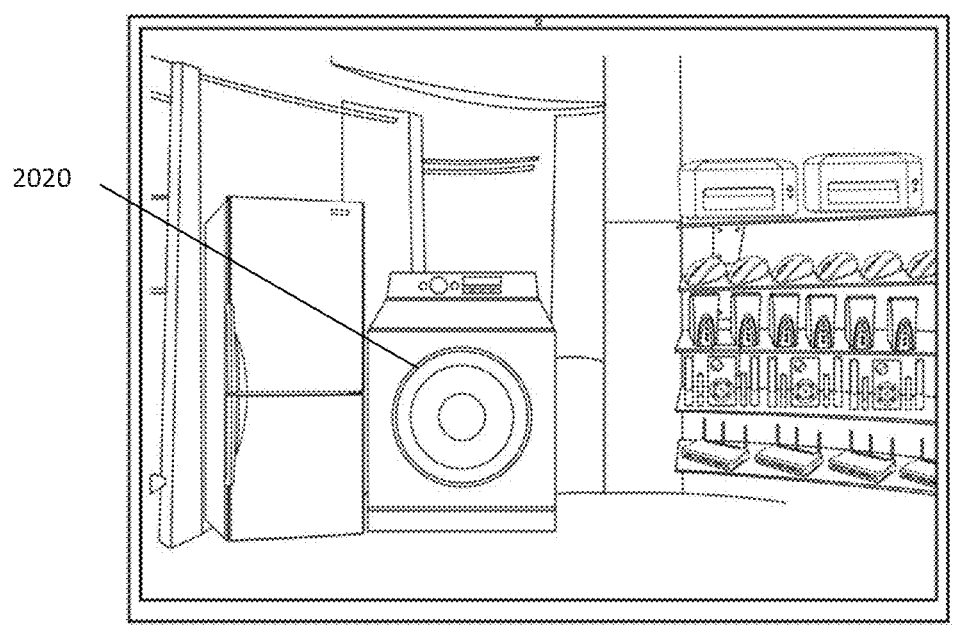

FIG. 20a-b shows schematic and perspective representation of a live telecast of a remote physical shop, where change in object is recognised and dynamic links are built in real-time for display of 3D-models. In the live video, it becomes difficult to detect type of object automatically in real time, and recognise change in object if the object is replaced in real store, such as a refrigerator 2010 to a washing machine 2020. The system of user-controlled realistic interaction of invention can recognise the change in object in real-time or with some time lag, and build dynamic links over each object identified. The user on providing input such as clicking on the objects displayed on the video can initiate display of 3D-model of the said object for further user-controlled interactions. The video of the physical showroom can be captured by conventional devices such as via a camera capable of capturing video, a transmitting unit and a receiving unit. The camera can be video camera or panoramic video camera. The receiving unit can receive the said video, and supply live feed to a central database of the system of user-controlled realistic interaction. The live feed data can be processed to make it compatible to run and viewed over http even in a website. The video of the physical showroom can be displayed either real-time or with some time lag.

Figure 21A:
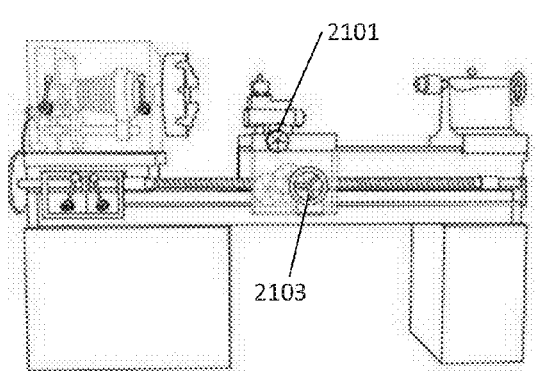
FIG. 21a-c shows perspective views of a mechanical engineering design of a 3D-model of a lathe machine for remote demonstration according to an embodiment of invention.
Figure 21B:
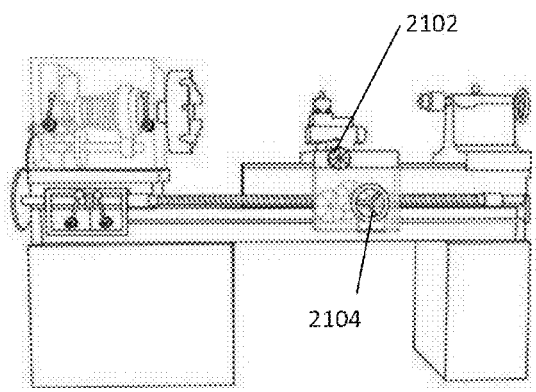
Figure 21C:
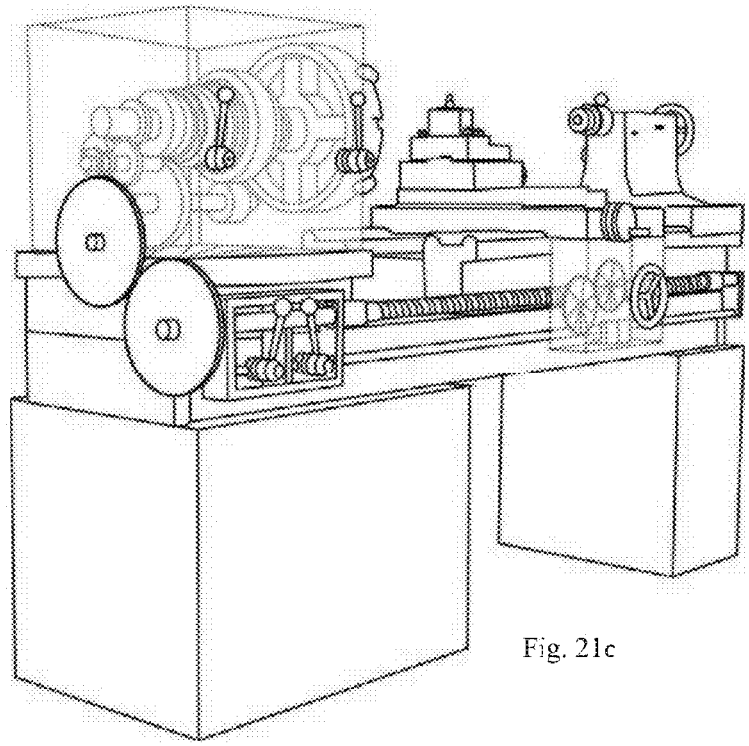

FIG. 21a-c shows perspective view of a mechanical engineering design of a 3D-model of a lathe machine for remote demonstration as another application of the user-controlled realistic simulation and interaction technology. It becomes difficult to collaborate and demonstrate complex machineries remotely using conventional means. The 3D-models simulated by user-controlled realistic simulation and interaction technology are not hollow and complete emulating real objects in real scenario, which can be used to provide remote demonstration of working of the said machine using extrusive, intrusive and time bound changes based interactions such as heating produced after certain time intervals. A sliding motion of middle part of lathe machine from one position 2101 to another position 2102 takes place on rotating a wheel 2103,2104 from one position 2103 to another position 2104 emulating real-set. The user can interact with its parts, to understand its functioning in virtual but real like setup, as the user would have interacted with real machine. If the user wishes to know more about the said product or machine, he can simply query the virtual assistant, which replies with precise answers as per the query. Query can be typed in a chat, where the virtual assistant will reply either by speaking or by action of moving lips or written message to solve the query.

Figure 22:
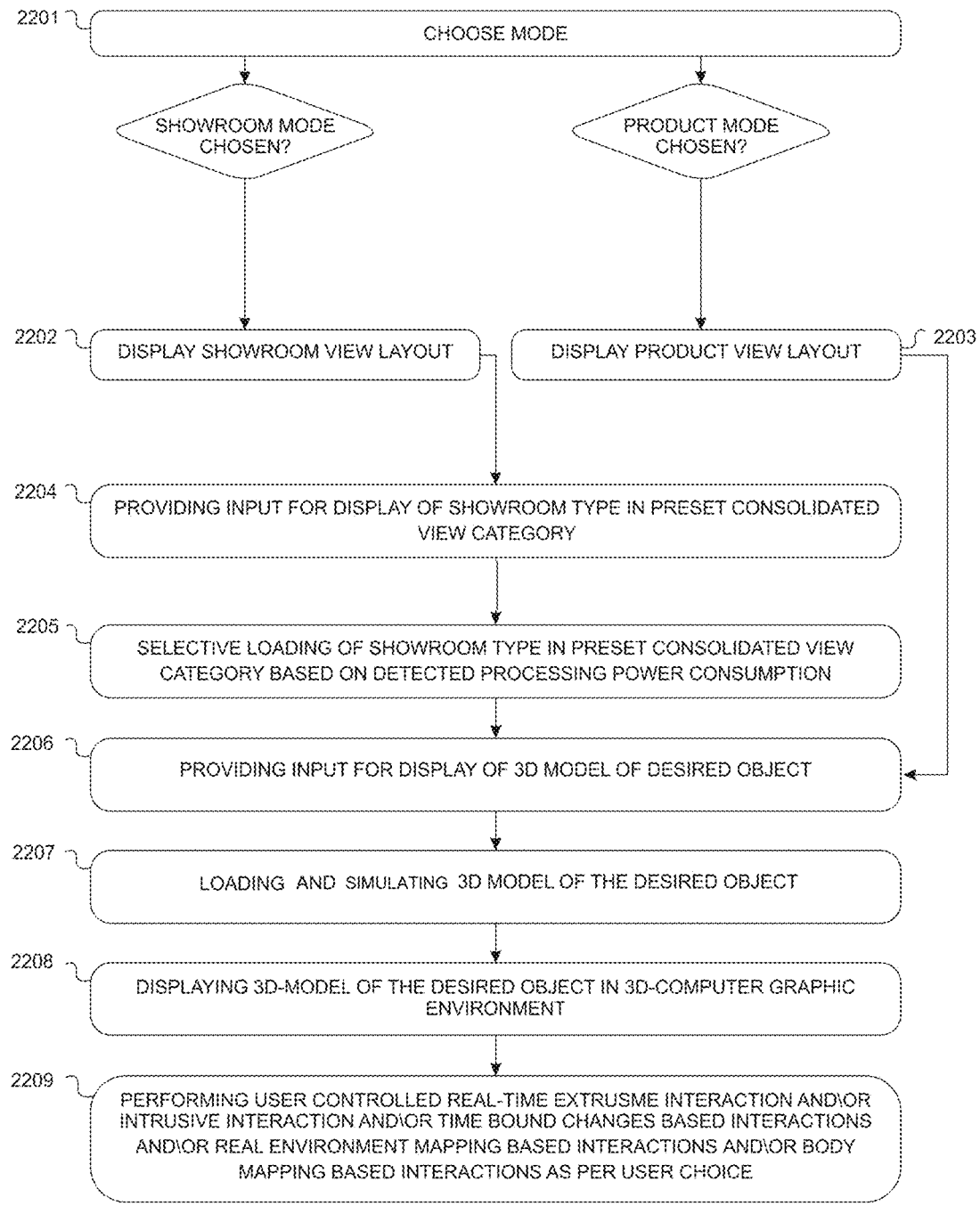
FIG. 22 shows another flowchart illustrating the method of user-controlled realistic simulation and interaction for enhanced object viewing and interaction experience according to invention.

FIG. 22 shows another flowchart of a method of user-controlled realistic simulation and interaction for enhanced object viewing and interaction experience. Step 2201, involves decision making in choosing of modes selected from either a showroom mode or product mode. The step 2201 is followed by different layouts displayed as per chosen mode. A showroom view layout is displayed in step 2202, if showroom mode is chosen, or a product view layout is displayed in step 2203, if product mode is chosen. In step 2204, input is provided by user for display of showroom type in pre-set consolidated view category after display of showroom view layout, where an input is requested for display of showroom type such as TV showroom, refrigerator showroom as per user choice. In step 2205, selective loading of showroom type in pre-set consolidated view category takes place. The user may have the option to switch views in one embodiment, if there is slow connection. If the network is slow, the entire showroom view is not loaded, whereas if the network and processor speed is satisfactory, then entire showroom view is loaded, but simulated and texturing is adjusted such that there is minimum visual impact on user side. This helps to minimize impact of slowness of network speed and processing power on the experience of viewing the realistic virtual simulations. This also enables quick loading of graphics for seamless viewing. In step 2206, among the plurality of objects displayed, an input is received for display of realistic 3D model of desired object, where this step can be directly reached or initiated after display of product view layout (2203) under product mode. The receiving input can be through conventional devices such as a pointing device such as mouse, via a keyboard or hand gesture guided input or eye movement guided input captured by a sensor of a system or touch, or by providing command to a virtual assistant system. The command to the virtual assistant system can be a voice command or via chat. In step 2207, realistic 3D-model of the desired object is loaded and simulated for which input is received. If the desired object is a computer or laptop or any computing device, a virtual operating sub-system is also loaded and installed within the loaded 3D-model such as within simulated 3D-model of laptop based on product or brand characteristics. Step 2208 involves displaying 3D-model of the desired object in 3D-computer graphic environment. The displayed 3D-model of the desired object has standard realistic 3D-view by default. Other interactive views can be a pressure view for judgement of pressure required to operate the said displayed object, a taste view to judge the perception of sense of taste, a temperature view for judging heat generated during operation of the said displayed object after certain time intervals and a touch view for judging the sense of softness touch when applied on the displayed object. Other views are available as per characteristics, state and nature of displayed object. In step 2209, user-controlled realistic interactions can be performed and made available with the displayed realistic 3D-model for emulating real scenario in real set-up. The user-controlled realistic interactions comprises of extrusive interaction, intrusive interactions, time bound changes based interaction, real environment mapping based interactions and/or user body mapping based interaction as per user choice and as per characteristics, state and nature of displayed object.

FIG. 23 shows a system of user-controlled realistic simulation and interaction for enhanced object viewing and interaction experience. The said system comprises:
  a) a graphical user interface (GUI) configured for accepting user inputs;
  b) a consolidated view displayer for displaying 3D graphics environment, containing one or more 3D-models in an organized manner using a 3D consolidated view generating engine;
  c) a 3D-model displayer for displaying 3D-model of an object simulated using a 3D objects generating engine, where the 3D-model displayer comprises at least one display space for displaying the virtual interactive 3D-model;
  d) a virtual operating sub-system for providing functionality of operation of displayed 3D-model, where the virtual operating sub-system is installed during loading of said 3D-model as per characteristics, state and nature of displayed object;
  e) optionally a virtual assistant sub-system as one input mode for two way communication;
  f) optionally a live telecast displayer for displaying live telecast of a place containing plurality of objects, where a dynamic link is built over each identified object, where each dynamic link invokes the 3D-model displayer for displaying 3D-model of the said identified object; and
  g) optionally a camera for capturing video for background mapping based interaction, where the video captured from the camera is layered beneath the 3D-model displayer;

The 3D-model displayer makes possible displaying real world objects virtually by user-controlled realistic simulation of 3D-model of the said objects in a manner such that interaction is made possible with the said objects in a life-like manner in real scenario. The 3D-model displayer is an interactive platform for carrying out extrusive interaction and/or intrusive interactions and/or time bound changes based interaction and/or real environment mapping based interactions as per user choice and as per characteristics, state and nature of the said object. The 3D objects generating engine uses image associated data, real object associated data, polygon data and texturing data of the said object for generating said 3D-model, where the simulated 3D-model comprises plurality of polygons. The said system can be implemented over hyper text transfer protocol in a wearable or non-wearable display. The virtual assistant sub-system comprises a graphical user interface, a natural language processing component for processing of user input in form of words or sentences and providing output as per the received input, where the natural language processing component is integrated to the central database. The virtual assistant sub-system further includes a microphone for receiving voice command, and sound output device.

The user-controlled realistic 3D simulation and interaction technology of the said system including a 3D-model displayer with virtual operating sub-system is useful to see digital objects in a three dimensional view from all angles like in real world, and simultaneously also operate simulated 3D-model of the object in realistic manner producing a realistic 3D visualisation effect over an electronic display.

The invention also provides for a 3D-model carrying similar properties such as appearance, shape, dimensions, texture, fitting of internal parts, object surface properties of touch, smoothness, and other nature, characteristics, and state of real object, where performing user-controlled realistic interactions selected from extrusive interaction, intrusive interactions, time-bound changes based interaction and real environment mapping based interactions are made possible as per user choice in real-time and as per characteristics, state and nature of the said object. The user-controlled realistic 3D simulation and interaction technology can allow dynamic customization of texturing pattern of 3D-model during loading of the 3D-model, thereby providing selective loading ability to 3D-model and making efficient use of memory. This optimizes the loading time, such that there is no or minimum visible impact on the viewing of 3D-model of the object even if data is transmitted over web-page via hypertext transfer protocol (HTTP). Another further object of the invention is to make possible building dynamic interactive points in real-time capable of displaying virtual 3D-objects in a live video from a live telecast of a place having plurality of real objects.

The invention also provides for a virtual operating sub-system for providing functionality of operation of displayed 3D-model, where the virtual operating sub-system is installed during loading of said 3D-model as per characteristics, state and nature of displayed object.

It will be noted that the drawing figures included are schematic representations, and generally not drawn to scale. It will be further noted that the schematic representations are used for explaining present invention, and are not actual 3D-models as per present invention. It will be understood that virtually any computer architecture such as client-server architecture may be used without departing from the scope of this disclosure. The system may take form of a server computer, where some components like camera, GUI, 3D-models are used or displayed or accessed at client side by LAN or through INTERNET. In some embodiments, the client side can also be a hand-held computing device such as laptop, smart phone etc.

Although a variety of examples and other information have been used to explain various aspects within the scope of the appended claims, no limitations of the claims should be implied based on particular features or arrangement in such examples, as one ordinary skill would be able to use these examples to derive a wide variety of implementations. The present embodiments are, therefore, to be considered as merely illustrative and not restrictive, and the described features and steps are disclosed as examples of components of systems and methods that are deemed to be within the scope of the following claims.

We claim:

1. A computer implemented method of user-controlled realistic 3D simulation for enhanced object viewing and interaction experience, the method comprising:

rendering and displaying a 3D model of the object in 3D-computer graphic environment where the displayed 3D model of the said object comprises at least one realistic 3D-view using texture data and computer graphics data of the 3D model of the object;

receiving an user input for interaction with the displayed 3D model, the user input is one or more commands for interaction, where each command is provided for performing user-controlled interactions in real-time or near real-time, wherein the interaction command is defined as input commands for performing different operations on at least one part of the 3D model to at least observe the 3D model or to experience functionality of the 3D model and at least one of its parts, or combination thereof;

identifying one or more commands;

in response to the identified commands, rendering of corresponding interaction to the 3D model of the object with or without sound output using the texture data, computer graphics data and selectively using sound data of the 3D model of the object; and displaying the corresponding interaction to the 3D model;

wherein the interaction comprises at least one of extrusive interaction, intrusive interactions, a time bound change based interaction, or a real environment mapping based interaction, or combination thereof, as per user choice, or as per characteristics, state and nature of the said object, or combination thereof;

wherein the time bound changes refers to representation of changes in the 3D model demonstrating change in physical property of object in a span of time on using or operating of the object, and real environment mapping refers to capturing a real time environment, mapping and simulating the real time environment to create a simulated environment for interacting with the 3D model;

wherein displaying the 3D model of the said object by:

selecting the 3D model either directly; or selecting a part of a consolidated-view with which the 3D model is connected, the consolidated-view comprises interactive image, or interactive video, or interactive animation, or interactive panoramic image; or selecting a part of interactive real time or near-real time feed video with which the 3D model is connected, wherein the real time or near-real time feed video is processed in real or near-real time to make feed video interactive for making objects in video selectable, wherein the real time feed video is processed by building a dynamic link over each object in video, such that each dynamic link makes the objects selectable invokes the 3D model displayer for displaying the 3D model of the said identified object, wherein the link built over each identified object in the live telecast displayer is a dynamic link built in real time or near-real time during real time video telecast of a remote place or a link built with a small lag time; and wherein the consolidated-view comprises a virtual assistant sub-system to receive an input for providing information, the information comprises at least information about one or more 3D models of one or more objects available or connected in the consolidated-view, or information about view shown in the consolidated view, or combination thereof, wherein the virtual assistant sub-system comprises an image processing or animation based talking character with at least facial or body expression, or combination thereof and which answers the users query using artificial intelligence.

2. The method according to claim 1, wherein rendering of corresponding interaction to the 3D model of the object in a way for displaying in a display system made of one or more electronic visual display, or projection based display, or combination thereof.

3. The method according to the claim 1, wherein displaying of at least one of new interactions to the 3D model while previously one or more interaction has been performed or another interaction is being performed on the 3D model.

4. The method according to the claim 1, wherein the extrusive interaction comprises:

interacting with the 3D model of the object having a graphical user interface (GUI) for experiencing functionality of Virtual operating sub system of displayed 3D model; to produce similar changes in corresponding GUI of the 3D model as in GUI of the object for similar input.

5. The method according to the claim 1, wherein the extrusive interaction comprises:

interacting with the 3D model of the object for rotating the 3D model in 360 degree in different planes.

6. The method according to the claim 1, wherein the extrusive interaction comprises:

operating at least one of light-emitting parts of the 3D model of the object for experiencing functioning of the light emitting parts, the functioning of the light emitting parts comprises glowing or emission of the light from the light emitting parts in the 3D model in similar pattern that of light emitting parts of the object.

7. The method according to the claim 1, wherein the extrusive interaction comprises:

interacting with the 3D model of the object having representation of one or more electronic display parts of the object to display response in electronic display part of the 3D model similar to the response to be viewed in electronic display parts of the object upon similar interaction.

8. The method according to the claim 1, wherein the extrusive interaction comprises:

interacting with the 3D model of the object having representation of electrical or electronic control of the object to display response in the 3D model similar to the response to be viewed in the object upon similar interaction.

9. The method according to the claim 1, wherein the extrusive interaction comprises:
   interacting with the 3D model for producing sound.

10. The method according to the claim 1, wherein the intrusive interactions comprise:
    interacting with one or more sub-parts of the 3D model of the object, wherein the sub-parts are those parts of the 3D model which are at least moved, slided, rotated, or operated for using the object, or combination thereof.

11. The method according to the claim 1, wherein the intrusive interactions comprise:
    interacting with one or more internal parts of the 3D model, wherein the internal parts of the 3D model represent parts of the object which are responsible for working of object but not required to be interacted for using the object, wherein interacting with the internal parts comprising at least one of removing, disintegrating, operating, or rotating of the internal parts, or combination thereof.

12. The method according to the claim 1, wherein the intrusive interactions comprise:
    disintegrating different parts of the object in exploded view.

13. The method according to the claim 1, wherein the real environment mapping based interaction comprises:
    capturing a video/image of an area in vicinity of the user, mapping and simulating the video or image of area of vicinity on a surface of the 3D model to provide a mirror effect.

14. The method according to the claim 1, wherein the real environment mapping based interaction comprises:
    capturing a video/image of an area in vicinity of the user, mapping and simulating the video or image of area of vicinity on a 3D space where the 3D model is placed.

15. The method according to the claim 1 comprising loading and simulating the 3D model of the said object in real-time, which further comprises:
    using image associated data of said object, and auto-linking with real object associated data, polygon data and texturing data of the said object in a simulative manner; and—transforming the linked polygon data, texturing data, image associated data and real object associated data into the 3D model of the said object.

16. The method according to claim 1, wherein the virtual assistant sub-system is placed beside the consolidated view or overlay in the consolidated-view.

17. The method according to claim 1, wherein the virtual assistant sub-system is intact at one position in the consolidated-view while the consolidated-view is being viewed.

18. The method according to the claim 1, where the realistic 3D-view is displayed initially, and where at least one of a pressure view, a taste view, a temperature view, and a touch view is displayed on request as per characteristics, state and nature of displayed object, wherein a pressure view is for judgment of pressure required to operate the said displayed object, a taste view is to judge sense of taste, a temperature view is for judging heat generated during operation of the displayed object after certain time intervals, a touch view is for judging sense of softness touch when applied on the displayed object.

19. The method according to claim 18, where the pressure view, the temperature view and the touch view while operating at least one of the parts of the 3D model or the 3D model as a whole is represented by texturing the corresponding parts or the entire 3D model in different color and/or texture representing different pressure, temperature, softness levels.

20. The method according to the claim 1, wherein the input is received from one or more of a pointing device such as mouse; a keyboard; a gesture guided input or eye movement or voice command captured by a sensor, an infrared-based sensor; a touch input; input received by changing positioning/orientation of accelerometer and/or gyroscope and/or magnetometer attached with wearable display or with mobile devices or with moving display; or a command to the virtual assistant sub-system.

21. The method according to claim 20, wherein command to the said virtual assistant sub-system is a voice command or text command, wherein the virtual assistant sub-system comprises a natural language processing component for processing of user input in form of words or sentences and providing output as per the received input.

22. A system of user-controlled realistic 3D simulation for enhanced object viewing and interaction experience comprising:
    one or more input devices;
    a display device;
    a computer graphics data related to graphics of a 3D model of the object, a texture data related to texture of the 3D model, and/or an audio data related to audio production by the 3D model which is stored in one or more memory units; and
    machine-readable instructions that upon execution by one or more processors cause the system to carry out operations comprising:
        rendering and displaying the 3D model of the said object in 3D-computer graphic environment where the displayed 3D model of the said object comprises at least one realistic 3D-view using the texture data and computer graphics data of the 3D model of the object;
        receiving an user input for interaction with the displayed 3D model, the user input is one or more commands for interaction, where each command is provided for performing user-controlled interactions in real-time or near real-time, wherein the interaction command is defined as input commands for performing different operations on different parts of the 3D model to observe the 3D model and/or to experience functionality of the 3D model and its parts;
        identifying one or more commands;
        in response to the identified commands, rendering of corresponding interaction to the 3D model of the object with or without sound output using the texture data, computer graphics data and selectively using sound data of the 3D model of the object; and
        displaying the corresponding interaction to the 3D model;
    wherein the interaction comprises extrusive interaction and/or intrusive interactions and/or a time bound change based interaction and/or a real environment mapping based interaction and combination thereof, as per user choice and/or as per characteristics, state and nature of the said object;
    wherein the time bound changes refers to representation of changes in the 3D model demonstrating change in physical property of object in a span of time on using or operating of the object, and real environment mapping refers to capturing a real time environment, mapping and simulating the real time environment to create a simulated environment for interacting with the 3D model;
    wherein displaying the 3D model of the said object by:
    selecting the 3D model either directly; or
    selecting a part of a consolidated-view with which the 3D model is connected, the consolidated-view comprises interactive image, or interactive video, or interactive animation, or interactive panoramic image; or selecting a part of interactive real time or near-real time feed video with which the 3D model is connected, wherein the real time or near-real time feed video is processed in real or near-real time to make feed video interactive for making objects in video selectable, wherein the real time feed video is processed by building a dynamic link over each object in video, such that each dynamic link makes the objects selectable invokes the 3D model displayer for displaying the 3D model of the said identified object, wherein the link built over each identified object in the live telecast displayer is a dynamic link built in real time or near-real time during real time video telecast of a remote place or a link built with a small lag time; and wherein the consolidated-view comprises a virtual assistant sub-system to receive an input for providing information, the information comprises at least information about one or more 3D models of one or more objects available or connected in the consolidated-view, or information about view shown in the consolidated view, or combination thereof, wherein the virtual assistant sub-system comprises an image processing or animation based talking character with at least facial or body expression, or combination thereof and which answers the users query using artificial intelligence.

23. The system according to claim 22, wherein rendering of corresponding interaction to the 3D model of the object in a way for displaying in a display system made of one or more electronic visual display or projection based display or combination thereof.

24. The system according to the claim 22, wherein displaying of new interactions to the 3D model while previously one or more interaction has been performed or another interaction is being performed on the 3D model.

25. The system according to the claim 22, wherein the extrusive interaction comprises:
interacting with the 3D model representing the object having a graphical user interface (GUI) for experiencing functionality of Virtual operating sub system of displayed 3D model; to produce similar changes in corresponding GUI of the 3D model as in GUI of the object for similar input.

26. The system according to the claim 22, wherein the extrusive interaction comprises:
interacting with the 3D model of the object for rotating the 3D model in 360 degree in different planes.

27. The system according to the claim 22, wherein the extrusive interaction comprises:
operating light-emitting parts of the 3D model of the object for experiencing functioning of the light emitting parts, the functioning of the light emitting parts comprises glowing or emission of the light from the light emitting parts in the 3D model in similar pattern that of light emitting parts of the object.

28. The system according to the claim 22, wherein the extrusive interaction comprises:
interacting with the 3D model of the object having representation of electronic display parts of the object to display response in electronic display part of the 3D model similar to the response to be viewed in electronic display parts of the object upon similar interaction.

29. The system according to the claim 22, wherein the extrusive interaction comprises:
interacting with the 3D model of the object having representation of electrical/electronic control of the object to display response in the 3D model similar to the response to be viewed in the object upon similar interaction.

30. The system according to the claim 22, wherein the extrusive interaction comprises:
interacting with the 3D model for producing sound.

31. The system according to the claim 22, wherein the intrusive interactions comprise:
interacting with sub-parts of the 3D model of the object, wherein the sub-parts are those parts of the 3D model which are moved and/or slided and/or rotated and/or operated for using the object.

32. The system according to the claim 22, wherein the intrusive interactions comprise:
interacting with internal parts of the 3D model, wherein the internal parts of the 3D model represent parts of the object which are responsible for working of the object but not required to be interacted for using the object, wherein interacting with internal parts comprising removing and/or disintegrating and/or operating and/or rotating of the internal parts.

33. The system according to the claim 22, wherein the intrusive interactions comprise:
disintegrating different parts of the object in exploded view.

34. The system according to the claim 22, wherein the real environment mapping based interaction comprises:
capturing a video/image of an area in vicinity of the user, mapping and simulating the video/image of area of vicinity on a surface of the 3D model to provide a mirror effect.

35. The system according to the claim 22, wherein the real environment mapping based interaction comprises:
capturing a video/image of an area in vicinity of the user, mapping and simulating the video/image of area of vicinity on a 3D space where the 3D model is placed.

36. The system according to the claim 22 comprising loading and simulating the 3D model of the said object in real-time, which further comprises:
using image associated data of said object, and auto-linking with real object associated data, polygon data and texturing data of the said object in a simulative manner; and
transforming the linked polygon data, texturing data, image associated data and real object associated data into the 3D model of the said object.

37. The system according to claim 22, wherein the virtual assistant sub-system is placed beside the consolidated-view or overlay in the consolidated-view.

38. The system according to claim 22, wherein the virtual assistant sub-system is intact at one position in the consolidated-view while consolidated-view is being viewed.

39. The system according to the claim 22, where the realistic 3D-view is displayed initially, and where at least one of a pressure view, a taste view, a temperature view, and a touch view is displayed on request as per characteristics, state and nature of displayed object, wherein a pressure view is for judgment of pressure required to operate the said displayed object, a taste view is to judge sense of taste, a temperature view is for judging heat generated during operation of the displayed object after certain time intervals, a touch view is for judging sense of softness touch when applied on the displayed object.

40. The system according to claim 39, where the pressure view, the temperature view and the touch view while operating parts of the 3D model or the 3D model as a whole is represented by texturing the parts or the entire 3D model in different color and/or texture representing different pressure, temperature, softness levels.

41. The system according to the claim 22, wherein the input is received from one or more of a pointing device such as mouse; a keyboard; a gesture guided input or eye movement or voice command captured by a sensor, an infrared-based sensor; a touch input; input received by changing positioning/orientation of accelerometer and/or gyroscope and/or magnetometer attached with wearable display or with mobile devices or with moving display; or a command to the virtual assistant sub-system.

42. The system according to claim 41, wherein command to the said virtual assistant sub-system is a voice command or text command, wherein virtual assistant sub-system comprises a natural language processing component for processing of user input in form of words or sentences and providing output as per the received input.

43. The system according to claim 22, wherein enhanced object viewing and interaction experience is provided over a web-page via hypertext transfer protocol, or as offline content in stand-alone system or as content in system connected to network through a display device which comprises wearable display or non-wearable display, wherein the non-wearable display comprises electronic visual displays such as LCD, LED, Plasma, OLED, video wall, box shaped display or display made of more than one electronic visual display or projector based or combination thereof, a volumetric display to display the 3D model and interaction in three physical dimensions, create 3-D imagery via emission, scattering, beam splitter or peeper's ghost based transparent inclined display or a one or more-sided transparent display based on peeper's ghost technology, and wherein wearable display comprises head-mounted display, optical head-mounted display which further comprises curved mirror based display or waveguide based display, head mount display for fully 3D viewing of the 3D model by feeding rendering of same view with two slightly different perspective to make a complete 3D viewing of the 3D model.

44. A computer program product stored on a non-transitory computer readable medium and adapted to be executed on which is communicably coupled to one or more processors, wherein the computer readable medium and the one or more processors are adapted to be coupled to a communication network interface, the computer program product on execution to enable the one or more processors to perform following steps comprising:

rendering and displaying the 3D model of the said object in 3D-computer graphic environment where the displayed 3D model of the said object comprises at least one realistic 3D-view using texture data and computer graphics data of the 3D model of the object;

receiving an user input for interaction with the displayed 3D model, the user input is one or more commands for interaction, where each command is provided for performing user-controlled interactions in real-time or near real-time, wherein the interaction command is defined as input commands for performing different operations on different parts of the 3D model to observe the 3D model and/or to experience functionality of the 3D model and its parts;

identifying one or more commands;

in response to the identified commands, rendering of corresponding interaction to the 3D model of the object with or without sound output using the texture data, computer graphics data and selectively using sound data of the 3D model of the object;

displaying the corresponding interaction to the 3D model;

wherein the interaction comprises extrusive interaction and/or intrusive interactions and/or a time bound change based interaction and/or a real environment mapping based interaction and combination thereof, as per user choice and/or as per characteristics, state and nature of the said object;

wherein the time bound change refers to representation of changes in the 3D model demonstrating change in physical property of the object in a span of time on using or operating of the object, and real environment mapping refers to capturing a real time environment, mapping and simulating the real time environment to create a simulated environment for interacting with the 3D model;

wherein displaying the 3D model of the said object by:

selecting the 3D model either directly; or selecting a part of a consolidated-view with which the 3D model is connected, the consolidated-view comprises interactive image, or interactive video, or interactive animation, or interactive panoramic image; or selecting a part of interactive real time or near-real time feed video with which the 3D model is connected, wherein the real time or near-real time feed video is processed in real or near-real time to make feed video interactive for making objects in video selectable, wherein the real time feed video is processed by building a dynamic link over each object in video, such that each dynamic link makes the objects selectable invokes the 3D model displayer for displaying the 3D model of the said identified object, wherein the link built over each identified object in the live telecast displayer is a dynamic link built in real time or near-real time during real time video telecast of a remote place or a link built with a small lag time; and wherein the consolidated-view comprises a virtual assistant sub-system to receive an input for providing information, the information comprises at least information about one or more 3D models of one or more objects available or connected in the consolidated-view, or information about view shown in the consolidated view, or combination thereof, wherein the virtual assistant sub-system comprises an image processing or animation based talking character with at least facial or body expression, or combination thereof and which answers the users query using artificial intelligence.

\* \* \* \* \*